US012420571B2

(12) United States Patent
Kubozono

(10) Patent No.: US 12,420,571 B2
(45) Date of Patent: Sep. 23, 2025

(54) PRINTING APPARATUS, CONTROL METHOD, AND STORAGE MEDIUM

(71) Applicant: CANON KABUSHIKI KAISHA, Tokyo (JP)

(72) Inventor: Kenji Kubozono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 18/326,326

(22) Filed: May 31, 2023

(65) Prior Publication Data

US 2023/0391112 A1 Dec. 7, 2023

(30) Foreign Application Priority Data

Jun. 2, 2022 (JP) ................................ 2022-090284

(51) Int. Cl.
*B41J 11/42* (2006.01)
*B41J 2/01* (2006.01)
*B41J 11/00* (2006.01)

(52) U.S. Cl.
CPC ................ *B41J 11/42* (2013.01); *B41J 2/01* (2013.01); *B41J 11/0095* (2013.01)

(58) Field of Classification Search
CPC .. B41J 11/0095; B41J 13/0009; B41J 25/001; B41J 2/04505; B41J 11/008; B41J 3/543; H04N 1/00724; G03G 15/5054; G03G 2215/0161; G01B 11/24; G06T 7/0004
See application file for complete search history.

(56) References Cited

U.S. PATENT DOCUMENTS

2007/0274746 A1* 11/2007 Ehara .................... G03G 21/02 399/301
2010/0259789 A1* 10/2010 Hadano ................ G06F 3/1259 358/1.15
2020/0314276 A1* 10/2020 Igarashi ............ H04N 1/00724
2021/0042910 A1* 2/2021 Lee ....................... H05K 13/08
2021/0197594 A1* 7/2021 Abe .................... B41J 13/0009
2021/0276348 A1* 9/2021 Suto ........................ B41J 11/42
2021/0276349 A1* 9/2021 Kuronuma .............. B41J 11/42

FOREIGN PATENT DOCUMENTS

JP 2014-172388 A 9/2014

* cited by examiner

*Primary Examiner* — John Zimmermann
(74) *Attorney, Agent, or Firm* — Canon U.S.A., Inc., IP Division

(57) ABSTRACT

A printing apparatus includes a conveyance unit to convey a printing medium, a printing unit, a support member, a detection unit, and a control unit. The detection unit emits light in a direction toward a surface of the support member supporting the printing medium and outputs information indicating an amount of light that is reflected The control unit performs setting related to the detection unit output to set output from the detection unit such that a difference between a value indicating the detection unit output in detecting the light reflected from the support member and a value indicating the detection unit output in detecting the light reflected from the conveyed printing medium is equal to or greater than a predetermined magnitude. The control unit executes predetermined processing related to an end portion of the conveyed printing medium based on the set output from the detection unit.

18 Claims, 18 Drawing Sheets

PRINTING APPARATUS, CONTROL METHOD, AND STORAGE MEDIUM

BACKGROUND OF THE DISCLOSURE

Field of the Disclosure

The present disclosure relates to a printing apparatus, a control method, and a storage medium.

Description of the Related Art

One of printing apparatuses configured to print an image on a printing medium detects the position of an end portion in a width direction of the printing medium on a support member or the position of an end portion in a conveyance direction thereof. The detection of the position of the printing medium on the support member makes it possible to prevent the printing of an image on a region other than the printing medium.

Japanese Patent Laid-Open No. 2014-172388 describes a method of detecting the position in which a value based on a detection amount of light reflected from a platen onto which the printing medium is conveyed exceeds a threshold as the position of the printing medium on the platen.

In Japanese Patent Laid-Open No. 2014-172388, the threshold for determining the position of the printing medium is set low to detect the position of the printing medium such as tracing paper with a lower reflectivity than that of plain paper in case tracing paper is conveyed. However, if the threshold is set low, the value based on the detection amount of the light reflected from the platen (support member) onto which no printing medium is conveyed may exceed the threshold due to the effect of electric noise. Therefore, there is a possibility that incorrect determination that there is a printing medium on the platen is occurred.

SUMMARY OF THE DISCLOSURE

According to an aspect of the present disclosure, a printing apparatus includes a conveyance unit configured to convey a printing medium in a conveyance direction, a printing unit configured to be in a position facing the printing medium conveyed by the conveyance unit and perform printing on the conveyed printing medium, a support member configured to be in a position facing the printing unit and support an opposite surface that faces opposite of a surface of the conveyed printing medium facing the printing unit, a detection unit configured to emit light in a direction toward a surface of the support member supporting the printing medium and output information indicating an amount of light that is reflected, and a control unit configured to perform setting related to the output from the detection unit to set output from the detection unit such that a difference between a value indicating the output from the detection unit in detecting the light reflected from the support member and a value indicating the output from the detection unit in detecting the light reflected from the conveyed printing medium is equal to or greater than a predetermined magnitude, and configured to execute predetermined processing related to an end portion of the conveyed printing medium based on the set output from the detection unit.

Further features of the present disclosure will become apparent from the following description of exemplary embodiments with reference to the attached drawings.

DESCRIPTION OF THE EMBODIMENTS

Figure 1:
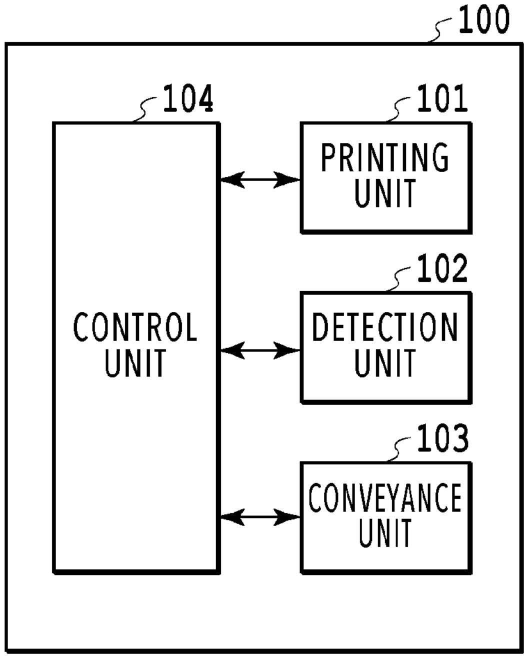
FIG. 1 is a block diagram illustrating a configuration of a printing apparatus.

Embodiments of a technique of the present disclosure are described below with reference to the drawings. The embodiments described below are not intended to limit the technique according to the scope of claims. The embodiments described below describe multiple characteristics; however, not all the multiple characteristics are necessarily essential for the technique of the present disclosure, and also the multiple characteristics may be combined with each other arbitrarily. Note that, the same or similar configurations are described while being denoted by the same reference numerals, and duplicated descriptions may be omitted.

Embodiment 1

[Configuration of Printing Apparatus]

FIG. 1 is a block diagram describing a configuration of a printing apparatus 100 according to the present embodiment. The printing apparatus 100 includes a printing unit 101 that performs printing of an image on a printing target medium (hereinafter, referred to as a printing medium), a detection unit 102 that detects the printing medium, a conveyance unit 103 that conveys the printing medium, and a control unit 104 that controls each unit in the printing apparatus 100. The control unit 104 includes a CPU, a ROM, and a RAM, for example.

Figure 2:
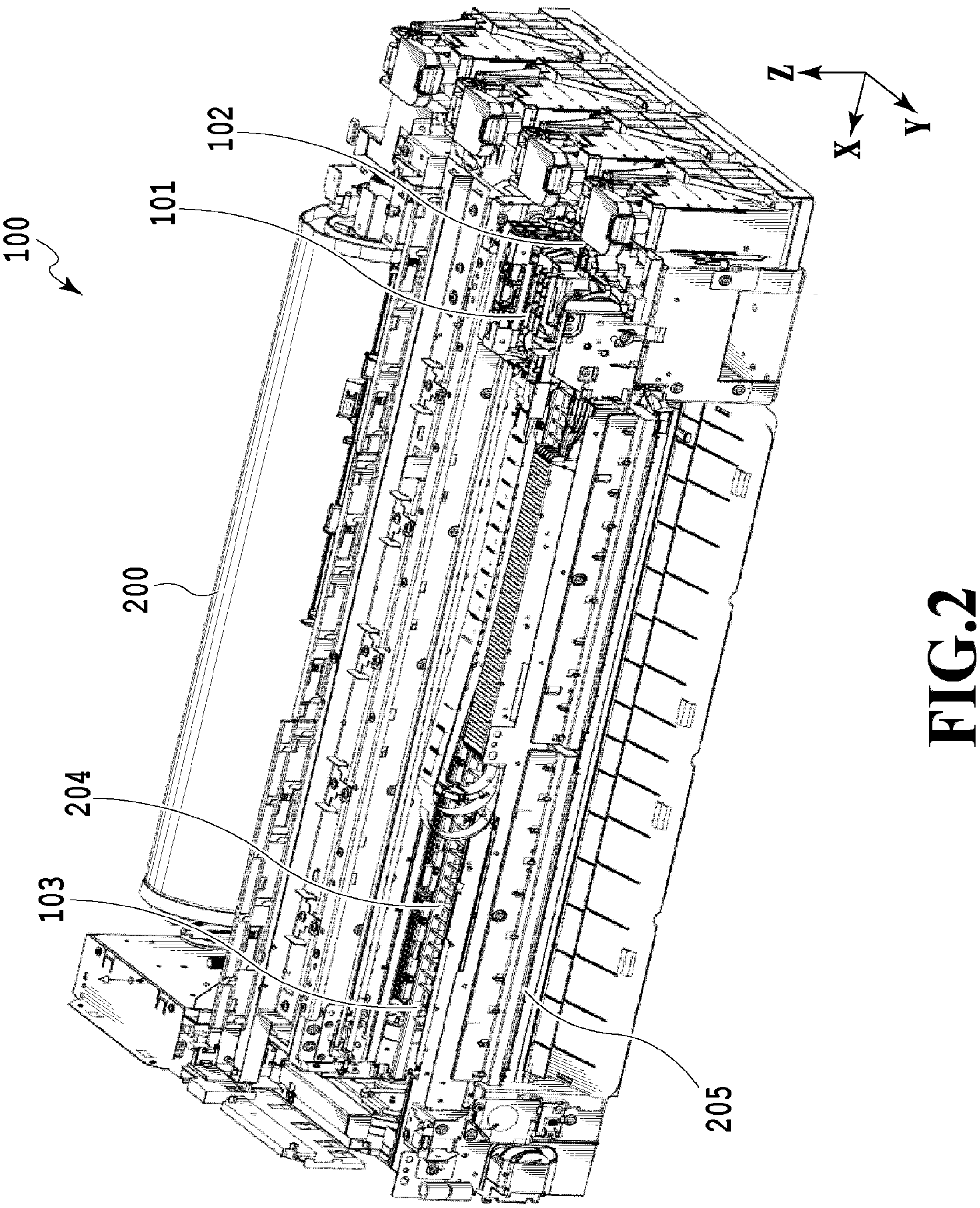
FIG. 2 is a perspective view describing inside of the printing apparatus.

FIG. 2 is a perspective view illustrating an internal configuration of the printing apparatus 100 of the present embodiment. For example, the printing unit 101 includes a printing head that applies ink to the printing medium and a carriage that holds the printing head and scans (moves) in a scanning direction (X direction in FIG. 2). For example, the printing head is an ink-jet printing head that ejects ink. The printing unit 101 performs printing of an image on a printing medium 200 with the carriage moving (scanning) in the scanning direction while holding the printing head and ejecting the ink from the printing head while scanning.

For example, the conveyance unit 103 includes a conveyance roller and a pinch roller. The printing medium 200 is sandwiched between the conveyance roller and the pinch roller, and with rotation of the conveyance roller, the printing medium 200 is conveyed in a conveyance direction (+Y direction in FIG. 2) orthogonal to the scanning direction to a position in which the printing unit 101 scans. With inverse rotation of the conveyance roller, it is also possible to convey the printing medium 200 in a rewind direction (−Y direction in FIG. 2), which is the opposite direction of the conveyance direction. A discharge unit 205 is configured to discharge the printing medium 200 to the outside of the apparatus. After the printing unit 101 scans and performs printing on the printing medium 200, the conveyance unit 103 conveys the printing medium 200, and the printing unit 101 scans and performs printing on the printing medium 200 again. Printing of a whole image is completed by repeating the printing and the conveyance as described above.

A support member 204 that supports the conveyed printing medium is arranged in a position facing a surface on which the printing unit 101 performs printing.

The detection unit 102 is a reflection type sensor that emits a light source downward to the support member 204, detects reflected light, and outputs information indicating a light amount of the reflected light (physical amount). Since the detection unit 102 is mounted in the carriage included in the printing unit 101, it is possible to use the detection unit 102 to detect whether there is the printing medium in an arbitrary position in the scanning direction of the printing medium 200.

[Configuration of Detection Unit]

Figure 3:
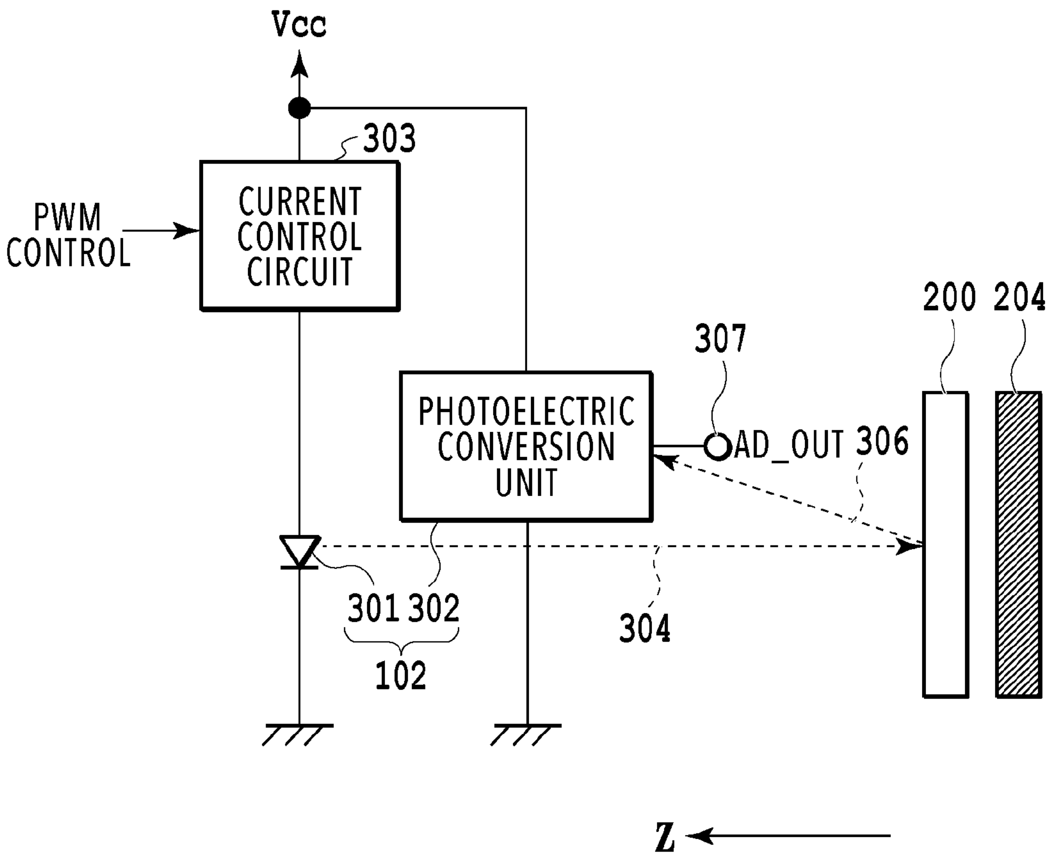
FIG. 3 is a schematic view describing a configuration of a detection unit.

FIG. 3 is a diagram illustrating an example of a configuration of the detection unit 102. The detection unit 102 includes an LED light source 301 and a photoelectric conversion unit 302.

Based on a control signal, the control unit 104 sets a PWM setting value for driving the LED light source 301 to a current control circuit 303. The current control circuit 303 causes the LED light source 301 to light by controlling the LED light source 301 based on the PWM setting value. The light emission amount of the LED light source 301 in this process is controlled by the PWM setting value. Emitted light 304 from the LED light source 301 is reflected by the support member 204 or the printing medium 200, and reflected light 306 thereof is received by the photoelectric conversion unit 302. In the photoelectric conversion unit 302, the reflected light is photoelectrically converted, and output 307 indicating the light amount of the reflected light is obtained. It is described that an AD value indicating a value of a voltage is obtained as the output 307. The control unit 104 can control the current control circuit 303 and can adjust the light emission amount so as to obtain a desired value as the output 307. The adjustment of the output is described later.

For example, the support member 204 is formed of a member with a lower reflectivity than that of the printing medium 200. Since the support member 204 and the printing medium 200 have different reflectivities, it is possible to detect whether the support member 204 or the printing medium 200 is under the detection unit 102 by using the output 307.

[About Conveyance of Printing Medium by Conveyance Unit]

Figure 4B:
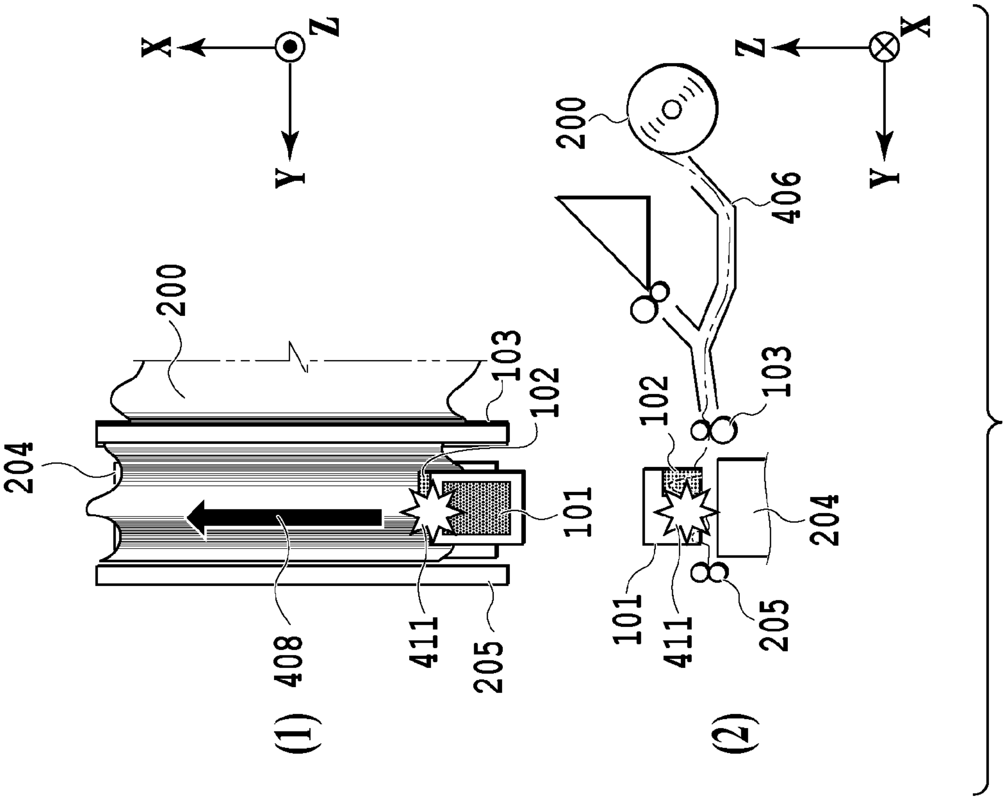
FIG. 4A and FIG. 4B are each a diagram of a schematic view describing conveyance of a printing medium in a comparative example.
Figure 4A:
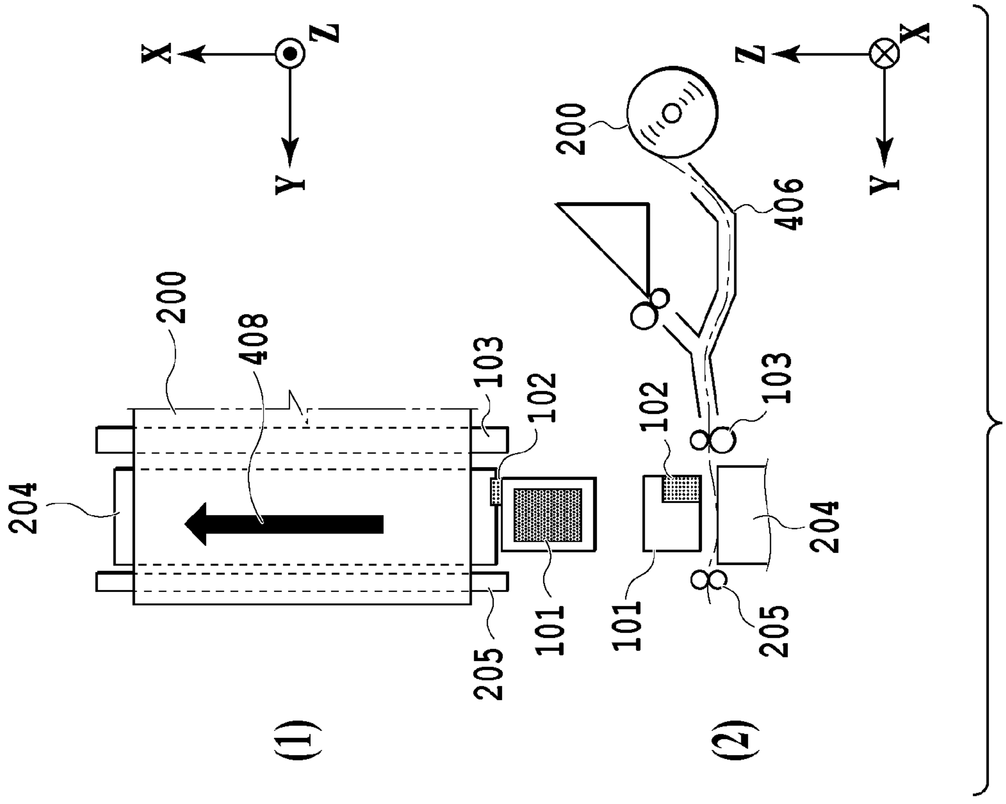

FIG. 4 is a schematic view describing a method of operating in conveying the printing medium in a comparative example. Diagrams (1) in FIGS. 4A and 4B are schematic views each illustrating an upper surface of the printing apparatus 100. Additionally, diagrams (2) in FIGS. 4A and 4B are schematic views each illustrating a side surface of the printing apparatus 100.

FIG. 4A is a diagram illustrating the printing apparatus 100 in a case where the printing medium 200 is normally conveyed by the conveyance unit 103. As illustrated by a conveyance route 406 in FIG. 4A, in a case where the printing medium 200 is normally conveyed, the printing medium 200 is conveyed so as to pass between the printing unit 101 and the support member 204. The printing unit 101 then scans in a scanning direction 408 and performs printing of an image on the printing medium 200. After the image is printed, the printing medium 200 is conveyed to the outside of the apparatus by the discharge unit 205.

FIG. 4B is a diagram describing a comparative example of a case where the printing medium 200 is not normally conveyed by the conveyance unit 103. FIG. 4B illustrates that the printing medium 200 is not properly supplied because of a wrong operation by the user and the like and paper-jamming occurs. If the printing unit 101 scans in the scanning direction 408 to perform printing of an image while paper-jamming occurs as described above, there is a possibility that the printing medium 200 and the printing unit 101 are brought into contact 411 with each other and the printing unit 101 is damaged.

Figure 5B:
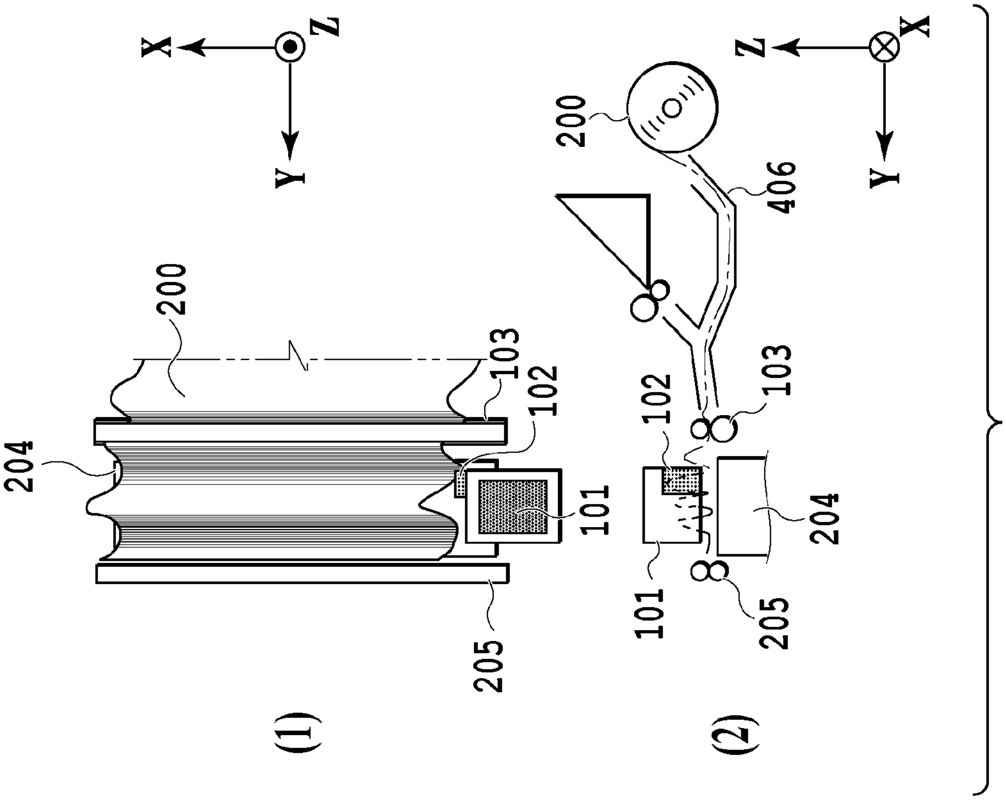
FIG. 5A and FIG. 5B are each a diagram of a schematic view describing conveyance of the printing medium.
Figure 5A:
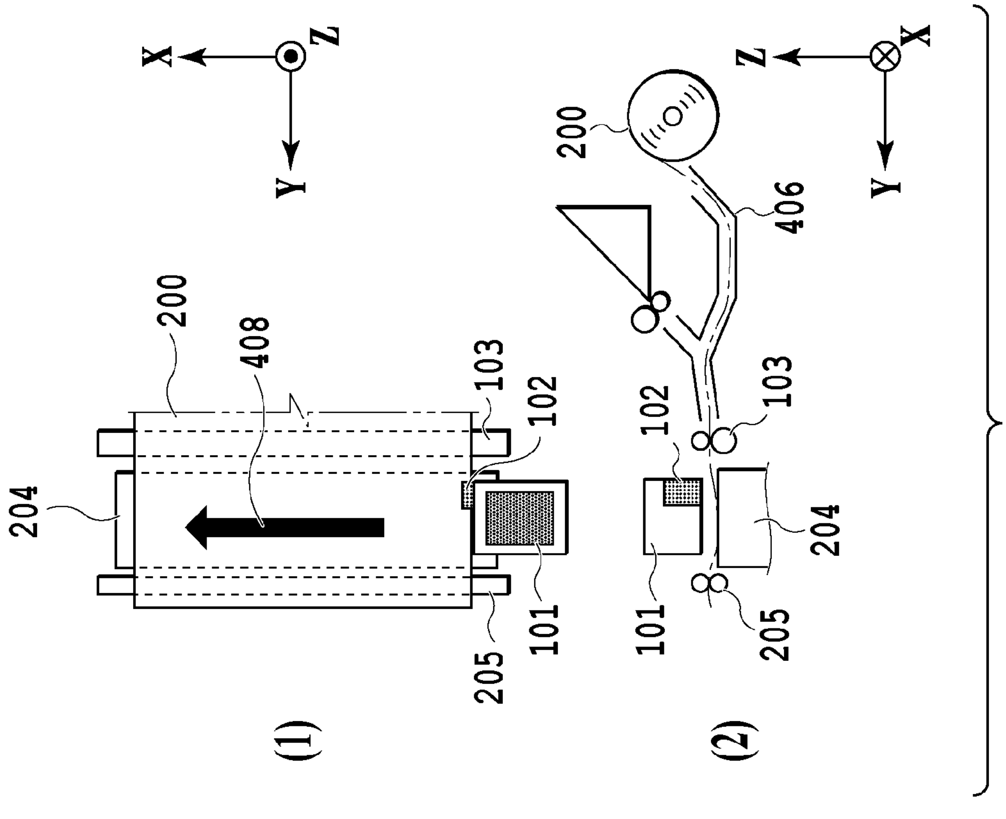

FIG. 5 is a schematic view describing an operation to convey the printing medium in the present embodiment. Diagrams (1) in FIGS. 5A and 5B are schematic views each illustrating the upper surface of the printing apparatus 100. Additionally, diagrams (2) in FIGS. 5A and 5B are schematic views each illustrating a side surface of the printing apparatus 100.

In the printing apparatus 100 in the present embodiment, as illustrated in FIG. 5A, the detection unit 102 performs the detection by being moved to a predetermined position (referred to as a conveyance detection position) in which the printing medium 200 passes in a case where the printing medium 200 is normally conveyed. As illustrated in FIG. 5A, the conveyance detection position is a position of an end portion of the printing medium 200 in the scanning direction. Thus, in the present embodiment, the detection unit 102 is moved to the conveyance detection position before the conveyance is started by the conveyance unit 103. Then, in a case where the conveyance of the printing medium 200 is started and the printing medium 200 passes under the detection unit 102 and is detected based on the output value from the detection unit 102, it is possible to determine that the conveyance is normally executed. Therefore, the printing apparatus 100 of the present embodiment can allow the printing unit 101 to properly scan in the scanning direction 408.

FIG. 5B is a diagram illustrating an operation in a case where paper-jamming occurs and the printing medium 200 is not normally conveyed by the conveyance unit 103 in the present embodiment. In a case where paper-jamming occurs, the printing medium 200 does not pass under the detection unit 102, or the printing medium 200 passes in an abnormal state. Thus, the printing medium 200 is not detected based on the output value from the detection unit 102, and accordingly it is possible to determine that the printing medium 200 is not normally conveyed if the printing medium 200 is not detected based on the output from the detection unit 102. Therefore, it is possible to stop the scanning of the printing unit 101 in the scanning direction 408 so as to prevent the damage on the printing unit 101.

[About Method of Detecting Printing Medium Based on Output from Detection Unit]

Figure 6C:
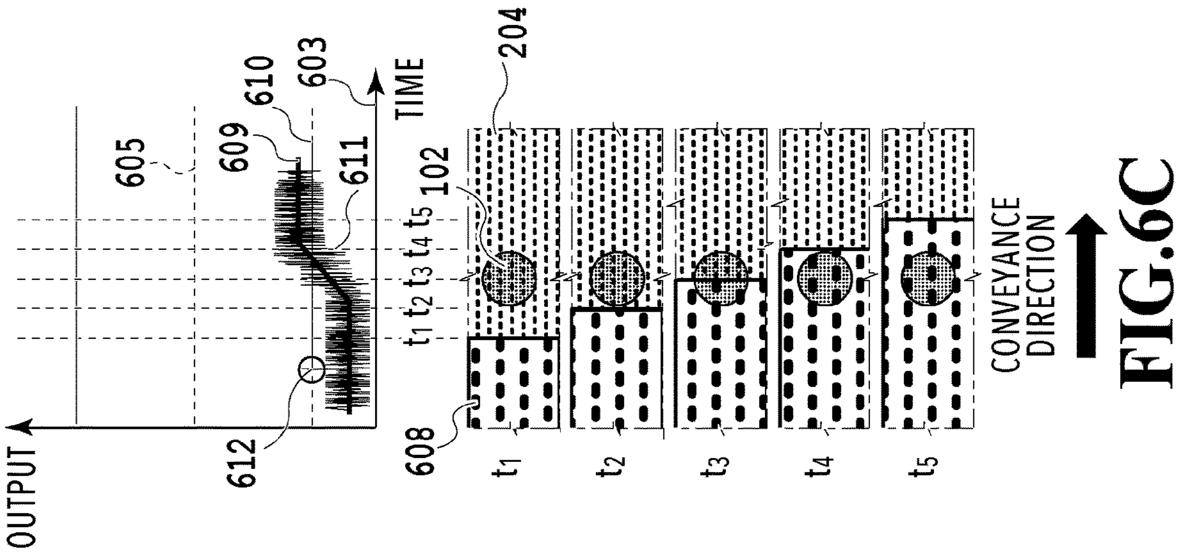
FIG. 6A, FIG. 6B, and FIG. 6C are each a diagram describing a method of detecting the printing medium based on an output value from the detection unit in a comparative example.
Figure 6B:
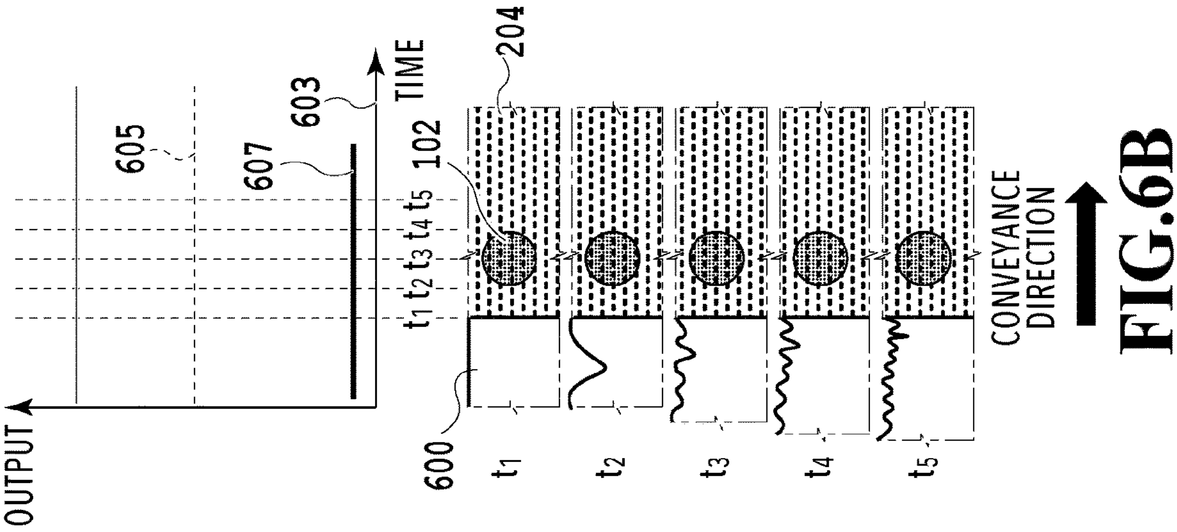
Figure 6A:
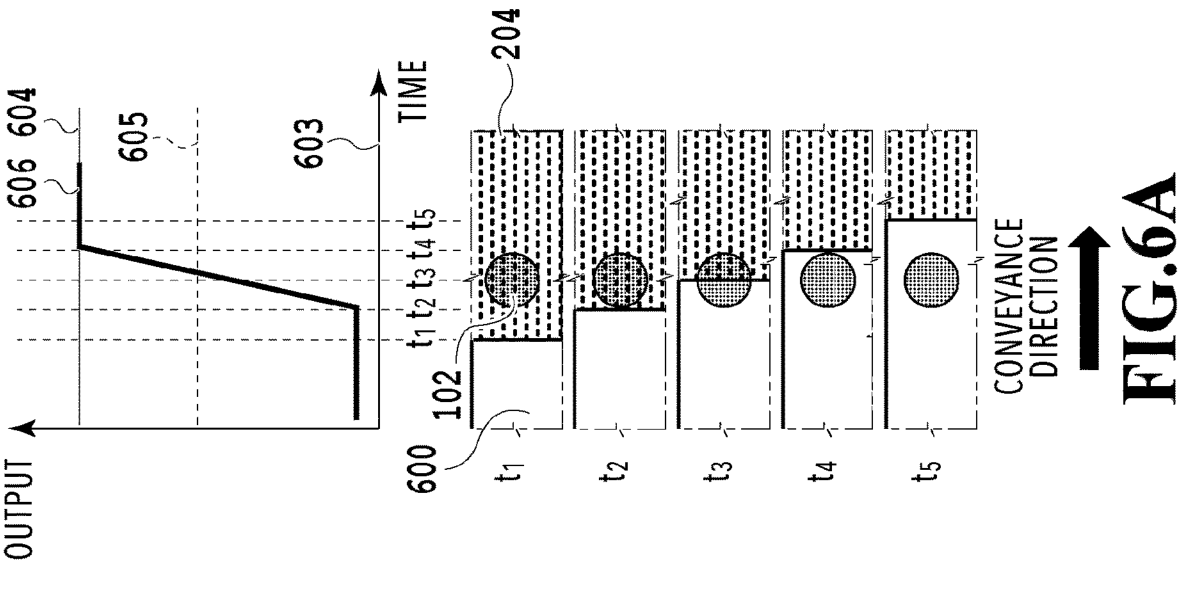

FIG. 6 is a diagram describing a comparative example of a method of determining whether the printing medium is normally conveyed based on the output value from the detection unit 102. Lower diagrams in FIGS. 6A to 6C each schematically illustrate a positional relationship between the detection unit 102 and the printing medium at each time in a case where the printing medium is conveyed while the detection unit 102 is fixed in the conveyance detection position. Upper diagrams (graphs) in FIGS. 6A to 6C are graphs each illustrating the output value from the detection unit 102 each time. The output value from the detection unit 102 is a value of a voltage and indicates that the light amount of the detected reflected light is great as the output value is great. In FIGS. 6A to 6C, a value between the minimum voltage 603 and the maximum voltage 604 is outputted from the detection unit 102.

FIG. 6A is a diagram in a case where the conveyed printing medium is plain paper 600. At time t1 and time t2, the plain paper 600 is not conveyed to the position under the detection unit 102, and the output value from the detection unit 102 is a value indicating the light amount of the light reflected from the support member 204. The plain paper 600 is then normally conveyed to reach under the detection unit 102 at time t3. The output value from the detection unit 102 in this case is substantially the same as a threshold 605. Then, at time t4 at which a leading edge of the plain paper 600 completely passes under the detection unit 102, the output value from the detection unit 102 is a value exceeding the threshold 605. Therefore, it is possible to determine whether the printing medium is normally conveyed by determining whether the output value from the detection unit 102 exceeds the threshold 605.

FIG. 6B is a diagram describing a case where paper-jamming occurs and the plain paper 600 is not normally conveyed by the conveyance unit 103. If paper-jamming occurs, an output value 607 from the detection unit 102 does not exceed the threshold 605 even at the time t4 at which the leading edge of the plain paper 600 completely passes under the detection unit 102 in a normal case. Therefore, if the output value from the detection unit 102 does not exceed the threshold 605 even if the printing medium is conveyed by a conveyance amount enough to reach the conveyance detection position, it is possible to detect that the plain paper 600 is not normally conveyed by the conveyance unit 103.

FIG. 6C is a diagram describing a comparative example of a case of conveying a printing medium 608, which has a lower reflectivity than that of the plain paper 600 and a small reflected light amount detected by the detection unit 102, like tracing paper or a semi-transparent film.

Even at the time t4 at which a leading edge of the printing medium 608, which has a low reflectivity like tracing paper or semi-transparent film, completely passes under the detection unit 102, an output value 609 from the detection unit 102 does not exceed the threshold 605 because the light amount of the reflected light is small. To deal with this, in the method in the comparative example, a threshold 610 smaller than the threshold 605 is set for the printing medium 608 with a low reflectivity such that the output value exceeds the threshold even with the reflected light from the printing medium 608 with a low reflectivity.

However, in some cases, the output value from the detection unit 102 includes the effect of electric noise 611. For this reason, if the threshold for determining whether the printing medium is normally conveyed is set low, an output value 612 including the noise effect before the printing medium is conveyed to the position of the detection unit 102 may exceed the threshold 610. Therefore, there is a possibility of incorrect detection that the printing medium 608 with a low reflectivity is normally conveyed although paper-jamming occurs. Thus, in the method in the comparative example, since the printing unit 101 may scan in some cases even if paper-jamming occurs, there is a possibility of damage on the printing unit 101 as described above. Therefore, it is required to reduce incorrect detection even in a case of conveying the printing medium 608 with a low reflectivity like tracing paper or semi-transparent film.

Figure 7:
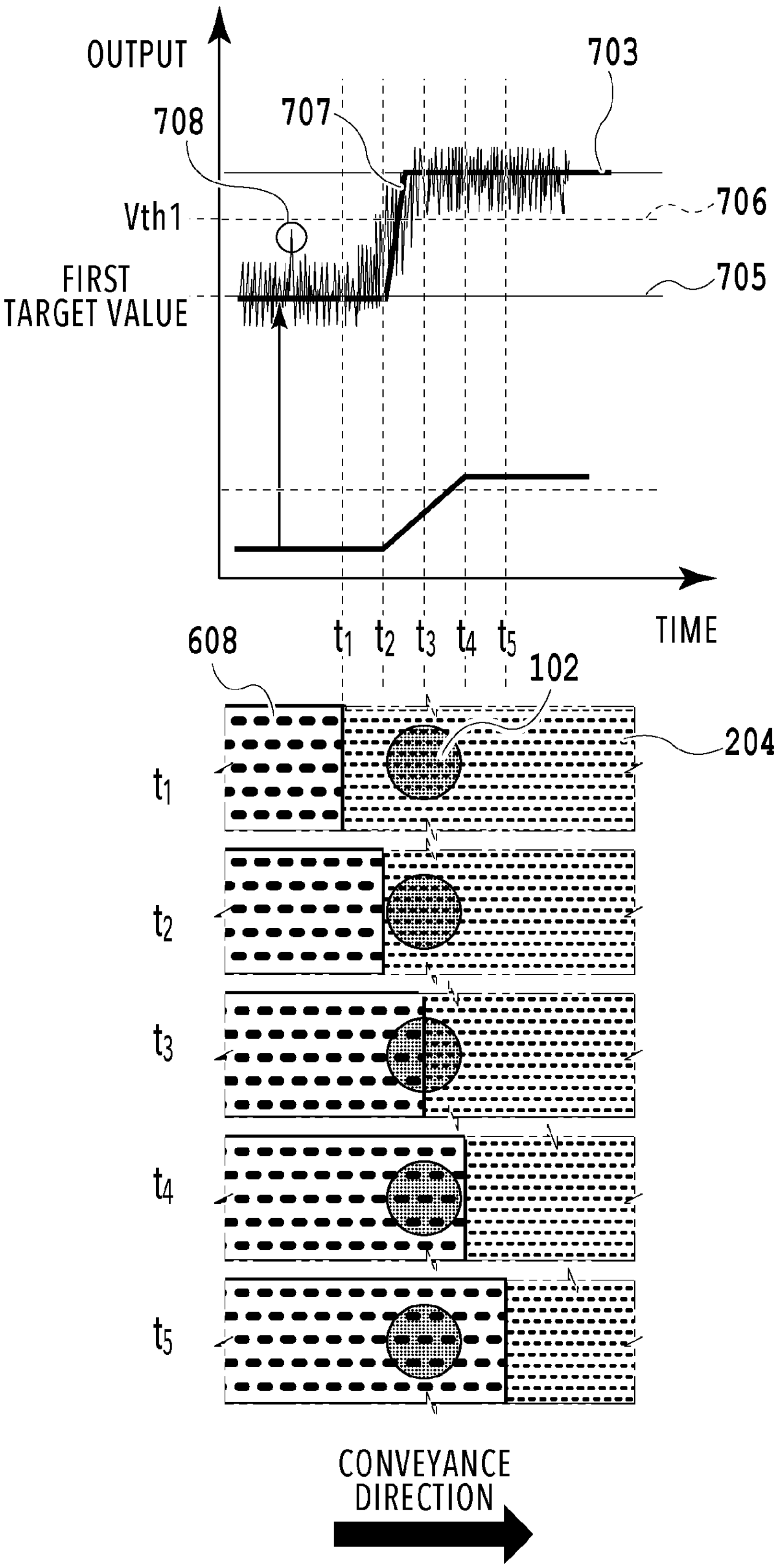
FIG. 7 is a diagram describing a method of detecting the printing medium based on the output value from the detection unit.

FIG. 7 is a diagram describing a method of detecting whether the printing medium is normally conveyed in the present embodiment. A configuration of FIG. 7 is the same as that of FIG. 6C.

In the present embodiment, the light emission amount of the LED light source 301 is adjusted such that the output value from the detection unit 102 indicating the light amount of the light reflected from the support member 204 (the output value at the time t1 or t2) is close to a first target value 705. The setting based on the adjustment is referred to as first setting or first calibration. This can make a difference between the output value in detecting the light reflected from the support member 204 (the first target value 705) and an output value 703 in detecting the light reflected from the printing medium 608 equal to or greater than a predetermined magnitude that is not affected by the noise. Therefore, the first target value may be set taken into consideration the noise effect.

A first threshold 706, which is a threshold for detecting whether the printing medium is normally conveyed in the present embodiment, is a value obtained by adding a predetermined value to the output value in detecting the light reflected from the support member 204 (the first target value 705). For example, the predetermined value is a value of 10% of the maximum output voltage. With the printing medium being conveyed after the output value indicating the light amount of the reflected light from the support member 204 is set to be the first target value as described above, it is possible to reduce incorrect detection caused because an output value 708 including the noise exceeds the first threshold 706.

Note that, even if the output value transitions as a curve 606 in FIG. 6A in a case of conveying the plain paper 600, the output value in detecting the light reflected from the support member 204 becomes close to the first target value 705 by performing the first calibration using the first target value 705. Additionally, since the output value becomes a value close to the maximum voltage in detecting the light reflected from the plain paper 600, the output value along the curve 606 transitions to a curve 707 in FIG. 7 by the first calibration using the first target value 705. For this reason, the first target value does not need to be changed depending on the type of the conveyed printing medium.

[About Conveyance Control]

Figure 8:
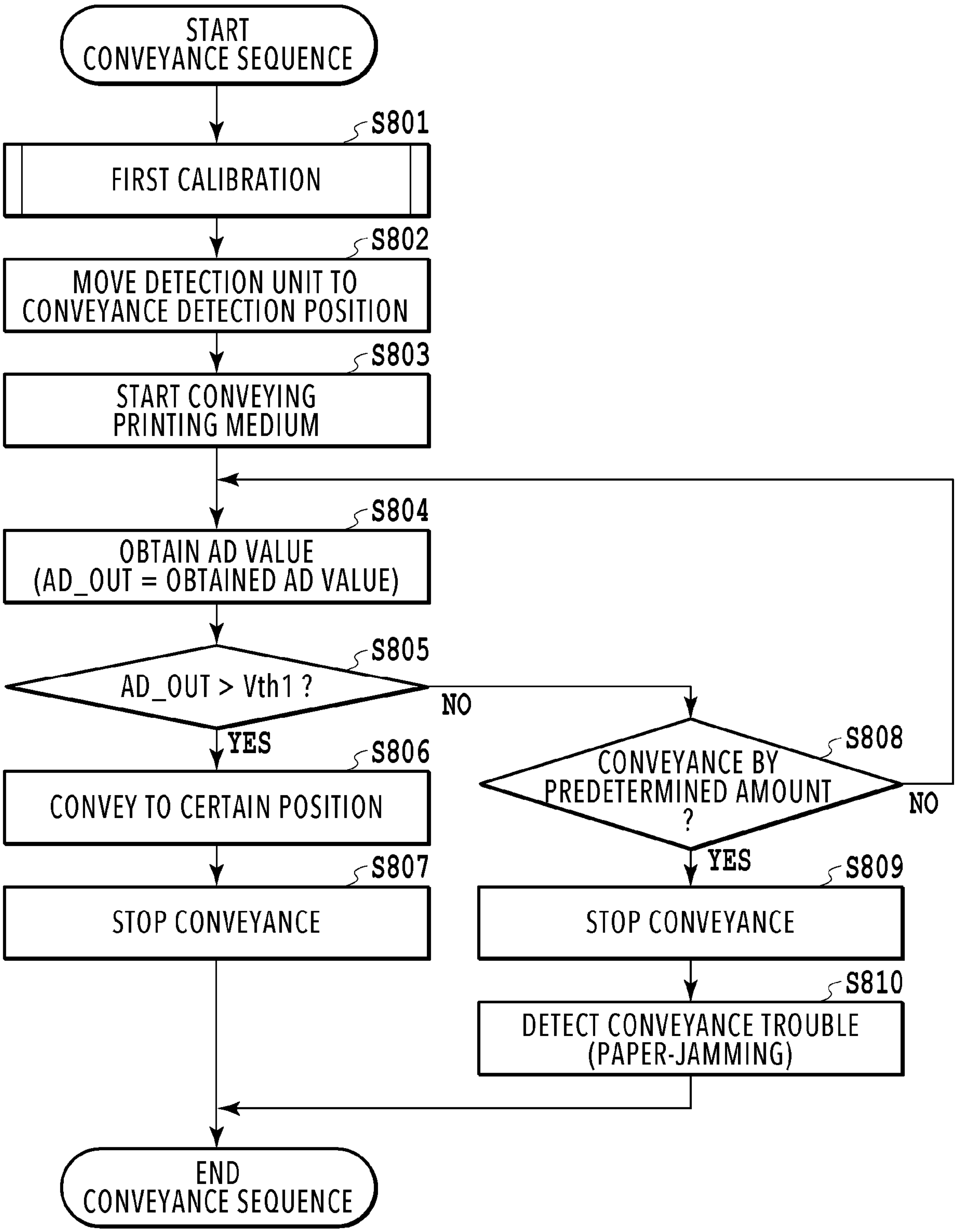
FIG. 8 is a flowchart describing conveyance processing.

FIG. 8 is a flowchart describing processing related to conveyance in the present embodiment. The flowchart in FIG. 8 is described assuming that a series of processing illustrated in the flowchart is performed with the CPU of the control unit 104 deploying and executing a program code stored in the ROM into the RAM. In addition, a part of or all the functions of steps in FIG. 8 may be implemented by hardware such as an ASIC and an electronic circuit. Note that, a sign "S" in the description of each processing means that it is a step in the flowchart, and the same applies to the following flowcharts. The flowchart in FIG. 8 is started in accordance with the start of a conveyance sequence.

In S801, the control unit 104 performs the first calibration and determines a first PWM setting value, which is for emission of the light amount that allows the output value from the detection unit 102 to be the first target value, and the above-described first threshold. Details of the first calibration are described later.

In S802, the control unit 104 moves the detection unit 102 to the conveyance detection position. As illustrated in FIG. 5A, for example, the conveyance detection position is a position in which the end portion of the conveyed printing medium in the scanning direction passes. The detection unit 102 is then caused to start the detection in the conveyance detection position. The detection unit 102 performs the detection by using the LED light source 301 lit based on the first PWM setting value set by the first calibration.

In S803, the control unit 104 causes the conveyance unit 103 to start conveying the printing medium.

In S804, the control unit 104 obtains the AD value outputted from the detection unit 102 and sets the obtained AD value to a current output value AD_OUT. The AD value is a value obtained with the photoelectric conversion unit 302 of the detection unit 102 detecting the reflected light from the light emitted downward from the LED light source 301 of the detection unit 102.

In S805, the control unit 104 compares the current output value AD_OUT from the detection unit 102 with a first threshold Vth1 to determine whether the current output value AD_OUT exceeds the first threshold Vth1. If the control unit 104 determines that the current output value AD_OUT exceeds the first threshold Vth1 (YES in S805), processing in S806 is executed.

In S806, the control unit 104 causes the conveyance unit 103 to convey the printing medium to a certain position. In S807, the control unit 104 then causes the conveyance unit 103 to stop conveyance, and the conveyance sequence ends assuming that the conveyance is normally executed.

On the other hand, if the control unit 104 determines that the current output value AD_OUT is equal to or smaller than the first threshold Vth1 (NO in S805), processing in S808 is executed.

In S808, the control unit 104 determines whether the conveyance amount by the conveyance unit 103 since the conveyance is started is equal to or greater than a predetermined amount. The predetermined amount is an amount equal to or greater than a conveyance amount by which the leading edge of the printing medium reaches the detection unit 102 in a normal case. If the control unit 104 determines that the conveyance amount is equal to or greater than the predetermined amount (YES in S808), it can be considered that a conveyance trouble occurs, and processing in S809 is executed. In S809, the control unit 104 causes the conveyance unit 103 to stop conveying the printing medium. In S810, the control unit 104 then detects the conveyance trouble.

On the other hand, if the control unit 104 determines that the conveyance amount is smaller than the predetermined amount (NO in S808), the processing returns to S804, and again, the AD value currently outputted from the detection unit 102 is obtained to update the current output value AD_OUT. The processing in and after S805 is then repeated.

[About First Calibration]

Figure 9:
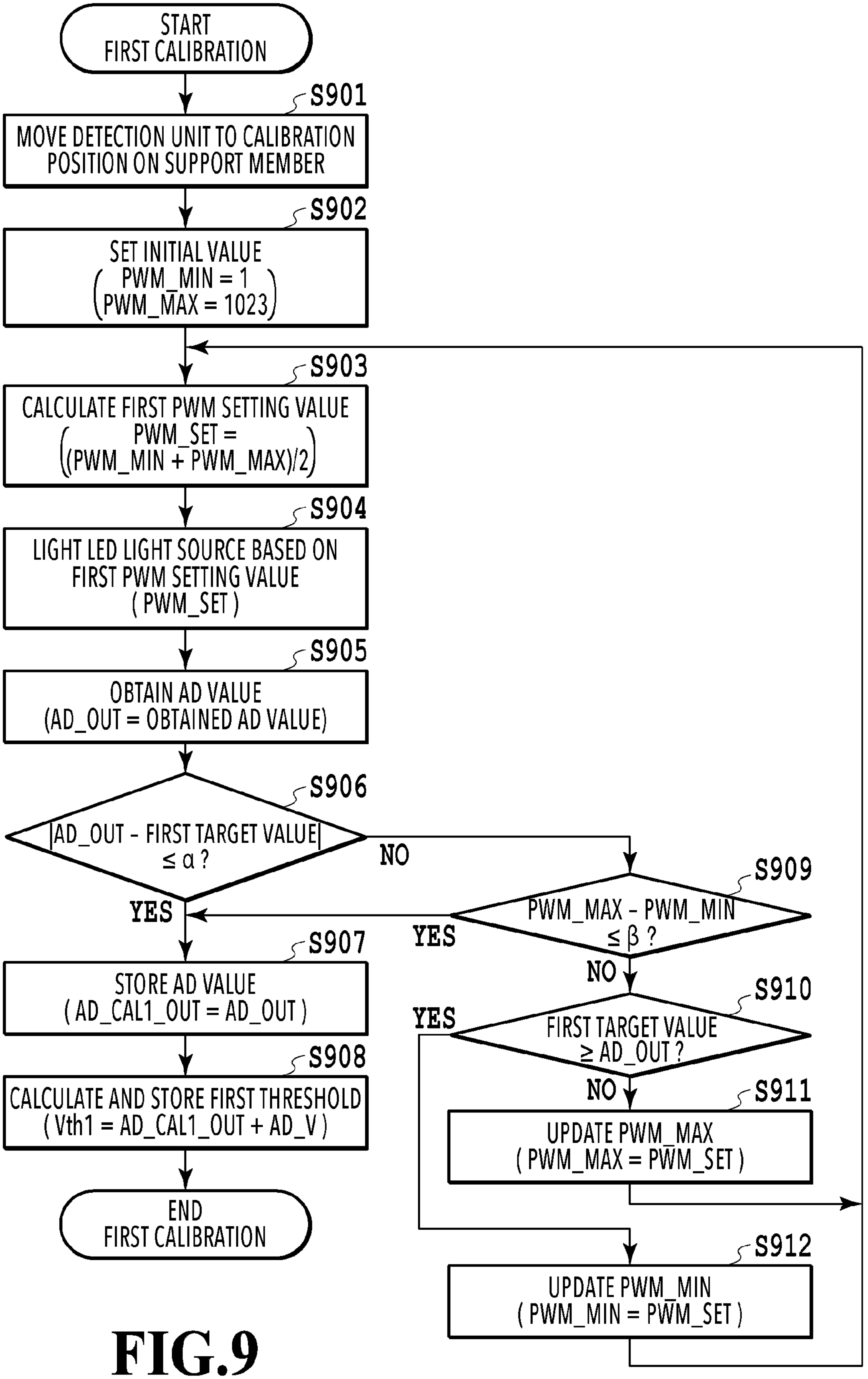
FIG. 9 is a flowchart describing first calibration.

FIG. 9 is a flowchart describing details of the first calibration. Details of the processing in S801 is described with reference to FIG. 9.

In S901, the control unit 104 moves the detection unit 102 to a first calibration position. The first calibration position is a position above the support member 204.

In S902, the control unit 104 sets initial values of PWM_MIN and PWM_MAX, which are values for calculating a first PWM setting value PWM_SET described later. For example, the setting is PWM_MIN=1, PWM_MAX=1023.

In S903, the control unit 104 calculates the first PWM setting value PWM_SET, which is a setting value for PWM-controlling the lighting of the LED light source 301, based on PWM_MIN and PWM_MAX. For example, the first PWM setting value PWM_SET is calculated by Expression (1):

$$PWM\_SET=(PWM\_MAX+PWM\_MIN)/2 \quad \text{Expression (1).}$$

In S904, the LED light source 301 is lit based on the set first PWM setting value PWM_SET. Since the first calibration is performed before the printing medium is conveyed, the light from the LED light source 301 is emitted onto the support member 204 that is supporting no printing medium.

In S905, the detection unit 102 outputs the AD value indicating the light amount of the reflected light detected by the photoelectric conversion unit 302 with the light emitted from the LED light source 301 being reflected by the support member 204. The control unit 104 obtains the outputted AD value and sets the value to the current output value AD_OUT of the detection unit 102. That is, the output value AD_OUT is obtained as a value indicating the light amount of the reflected light from the support member 204 that corresponds to the light emission amount based on the current first PWM setting value PWM_SET.

In S906, the control unit 104 determines whether the obtained current output value AD_OUT is within a range based on the above-described first target value. Specifically, the control unit 104 determines whether |AD_OUT−first target value| is equal to or smaller than an AD convergence determination value α. If the control unit 104 determines that |AD_OUT−first target value| is equal to or smaller than the AD convergence determination value α (YES in S906), processing in S907 is executed.

If it is determined as YES in S906, it means that the current output value AD_OUT is sufficiently close to the first target value. Accordingly, the LED light source 301 is lit based on the current first PWM setting value PWM_SET in the detection by the detection unit 102 in the conveyance detection processing in FIG. 8.

In S907, the control unit 104 sets the current output value AD_OUT to a value AD_CAL1_OUT for calculating the first threshold Vth1, and the processing proceeds to S908.

In S908, the control unit 104 calculates the first threshold Vth1 based on the value AD_CAL1_OUT, stores the calculated first threshold Vth1 as the first threshold, and ends the first calibration.

The first threshold Vth1 is calculated by Expression (2). AD_V in Expression (2) is a value of 10% of the maximum output voltage:

$$Vth1=AD\_CAL1\_OUT+AD\_V \quad \text{Expression (2).}$$

On the other hand, if the control unit 104 determines that |AD_OUT−first target value| is greater than the AD convergence determination value α (NO in S906), processing in S909 is executed.

In S909, the control unit 104 determines whether a value (PWM_MAX−PWM_MIN) obtained by subtracting current PWM_MIN from current PWM_MAX is equal to or smaller than a PWM convergence determination value β in order to determine whether the current first PWM setting value PWM_SET converges. If the control unit 104 determines that the value (PWM_MAX−PWM_MIN) is equal to or smaller than the PWM convergence determination value β (YES in S909), the processing proceeds to S907, and the above-described processing in S907 to S908 is executed. That is, the processing proceeds to S907 in order to calculate the first threshold Vth1 by setting the current output value AD_OUT to the value AD_CAL1_OUT.

On the other hand, if the control unit 104 determines that the value (PWM_MAX−PWM_MIN) is greater than the PWM convergence determination value β (NO in S909), processing in S910 is executed.

In S910, the control unit 104 determines whether the current output value AD_OUT is equal to or smaller than the first target value. If the control unit 104 determines that the current output value AD_OUT is equal to or smaller than the first target value (YES in S910), processing in S912 is executed.

In S912, the control unit 104 updates the value of PWM_MIN to the value of the current first PWM setting value PWM_SET, and the processing returns to S903. In S903, the control unit 104 calculates Expression (1) based on the updated PWM_MIN to update the first PWM setting value PWM_SET.

Since PWM_MIN is updated in S912, the first PWM setting value PWM_SET is updated such that the increased light emission amount of the LED light source 301 is emitted. Therefore, it is possible to set the output value AD_OUT obtained in the following S905 close to the first target value.

On the other hand, if the control unit 104 determines that the current output value AD_OUT is greater than the first target value (NO in S910), processing in S911 is executed. In S911, the control unit 104 updates the value of PWM_MAX to the value of the current first PWM setting value PWM_SET. The processing then returns to S903, and Expression (1) is calculated based on the updated PWM_MAX to update the first PWM setting value PWM_SET.

Since PWM_MAX is updated in S911, the first PWM setting value PWM_SET is updated such that the reduced light emission amount of the LED light source 301 is emitted. Therefore, it is possible to set the output value AD_OUT obtained in the following S905 close to the first target value.

According to the present embodiment as described above, even in a case of conveying the printing medium with a low reflectivity like tracing paper or semi-transparent film, it is possible to reduce incorrect detection due to variation in the output from the detection unit 102 caused by the noise effect. Additionally, it is possible to reduce the effect of the variation in the output from the detection unit 102 that occurs depending on the type of the printing medium. Therefore, it is possible to properly detect whether the printing medium is conveyed to the support member with no abnormality.

Embodiment 2

In Embodiment 1, it is described a method of detecting whether abnormality such as paper-jamming occurs on the conveyed printing medium by causing the detection unit 102 to start the detection before the printing medium is conveyed. In the present embodiment, a method of detecting the end portion of the printing medium by performing the detection while proportionally moving the detection unit 102 with respect to the conveyed printing medium is described. In the present embodiment, a difference from Embodiment 1 is mainly described. A part not stated otherwise is the same configuration and processing as that in Embodiment 1.

Figure 10A:
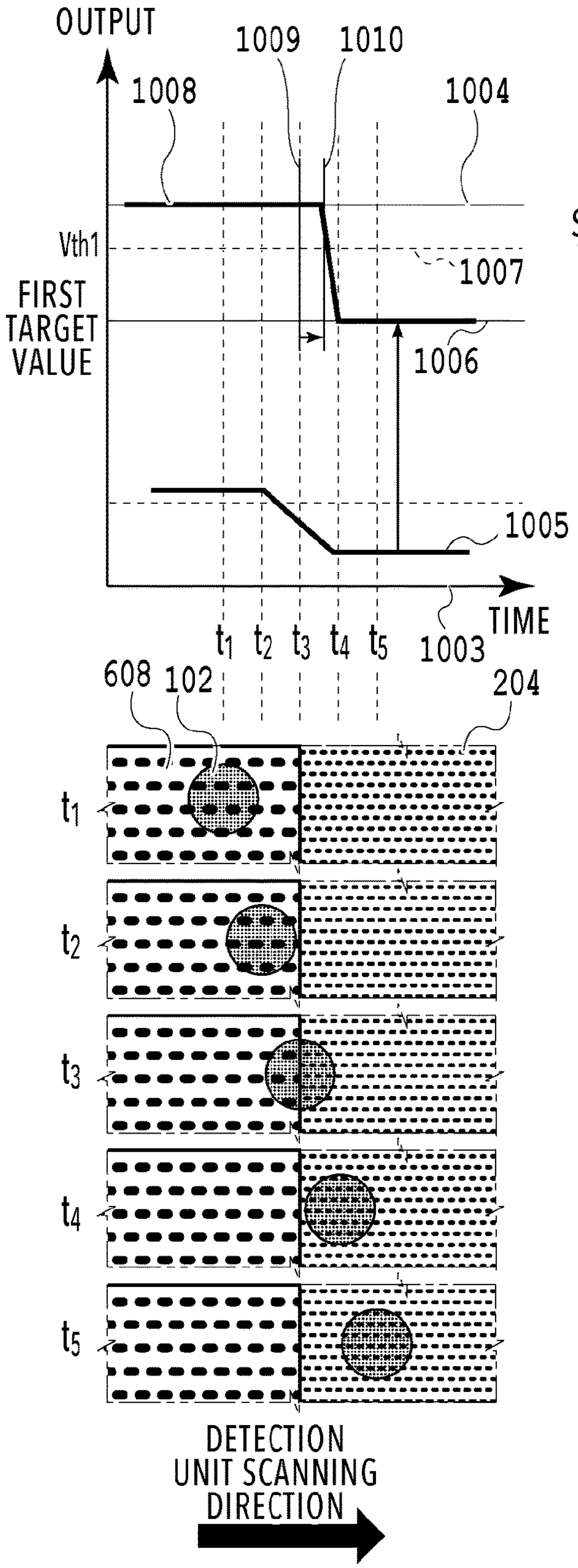
FIG. 10A and FIG. 10B are each a diagram describing a method of detecting the printing medium based on the output value from the detection unit.
Figure 10B:
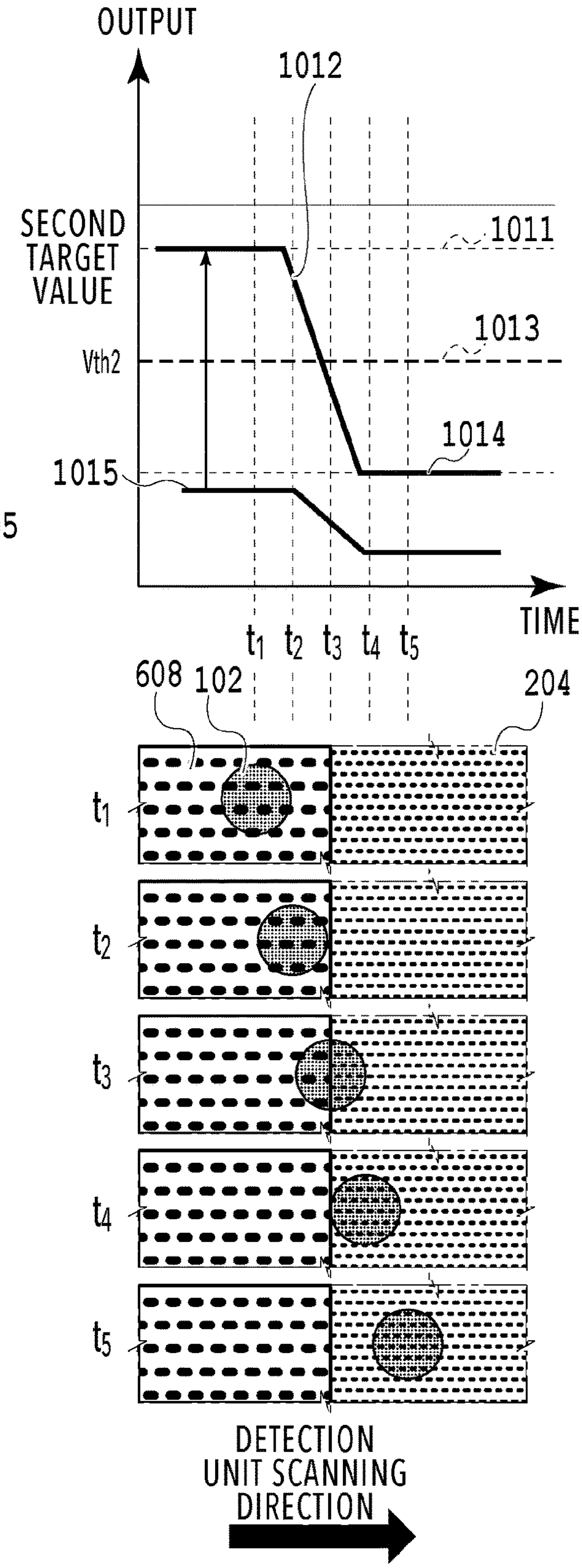

FIG. 10 is a diagram describing a method of detecting a position of the end portion of the printing medium based on the output value from the detection unit 102. Lower diagrams in FIGS. 10A and 10B each schematically illustrate a positional relationship between the detection unit 102 and the printing medium at each time in a case where the detection unit 102 scans in the scanning direction while the position of the printing medium is fixed. Upper diagrams in FIGS. 10A and 10B are graphs each illustrating the output value from the detection unit 102 at each time. The output value from the detection unit 102 is a value between the minimum voltage 1003 and the maximum voltage 1004.

A curve 1008 in FIG. 10A indicates transition of the output value in a case where the PWM setting value is set such that an output value 1005, which indicates the reflected light from the support member 204, is close to a first target value 1006 by the first calibration. Additionally, a first threshold 1007 is a value obtained by adding a predetermined value to the first target value 1006. Thus, the first threshold 1007 is set not taken into consideration the output value from the detection of the reflected light of the printing medium.

Based on the setting of the first calibration, the curve 1008 is compared with the first threshold 1007, and the position of the detection unit 102 at the time when the output value reaches the first threshold 1007 is detected as the end portion of the printing medium. In this case, as illustrated in FIG. 10A, although an output value 1010 matches the first threshold 1007 at the time t4, the position of the detection unit 102 at the time t4 does not match the position of the end portion of the printing medium 608. Thus, if the end portion is detected based on the setting of the first calibration, a different position may be detected as the end portion.

FIG. 10B is a diagram describing a method of detecting the position of the end portion of the printing medium in the present embodiment. In the present embodiment, the light emission amount of the LED light source 301 is adjusted by adjusting a second PWM setting value such that an output value 1015 from the detection unit 102, which indicates the light amount of the light reflected from the printing medium 608 (output value at the time t1), is close to a second target value 1011. The setting based on the adjustment is referred to as second setting or second calibration. A curve 1012 indicates transition of the output value in a case of performing the second setting.

Additionally, a value obtained by dividing by two a sum of an output value 1014 in detecting the support member 204 by the detection unit 102 under the second setting and an output value in detecting the printing medium 608 (the second target value 1011) is a second threshold 1013. In the present embodiment, the position of the detection unit 102 at the time when the output value reaches the second threshold 1013 is detected as the position of the end portion of the printing medium 608. Therefore, it is possible to more properly detect the end portion of the printing medium than a case of detecting the end portion based on the first PWM setting value and the first threshold determined by the first calibration.

[About Detection of End Portion of Conveyed Printing Medium]

Figure 11:
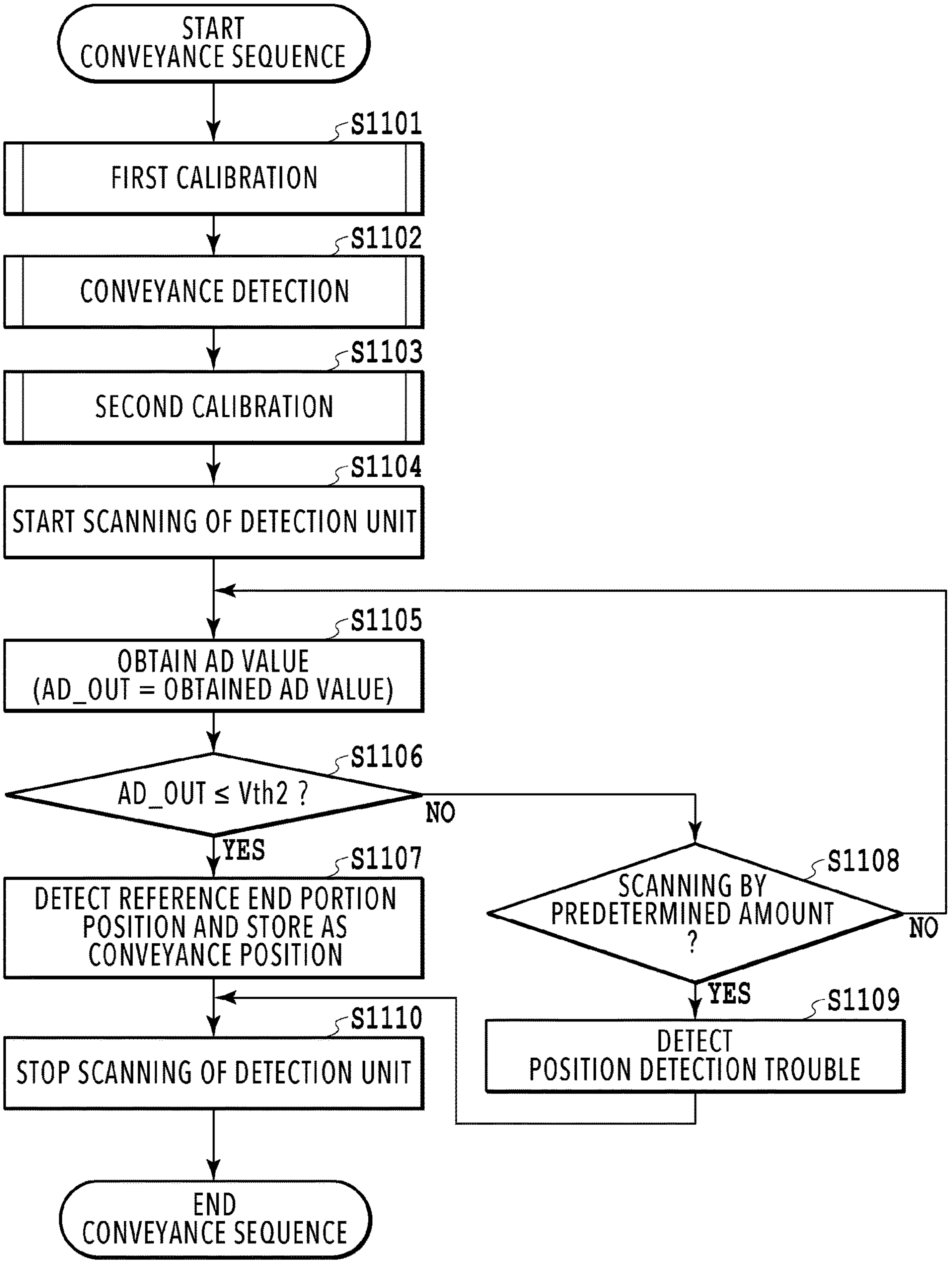
FIG. 11 is a flowchart describing conveyance processing.

FIG. 11 is a flowchart describing processing related to conveyance of the printing medium in the present embodiment.

In S1101, the first calibration is executed. The description of the first calibration is omitted since it is the same as S801.

In S1102, the conveyance detection processing is executed. Since the conveyance detection processing is the processing in S802 to S810 in FIG. 8, the description is omitted. Note that, if occurrence of a conveyance trouble is detected in the conveyance detection processing, the flowchart in FIG. 11 ends.

In S1103, the second calibration is performed, and the second PWM setting value for setting the output value to the above-described second target value and the above-described second threshold are set. Details of the second calibration are described later. In the steps described later, the detection by the detection unit 102 is performed by using the LED light source 301 lit based on the second PWM setting value set by the second calibration.

In S1104, the control unit 104 causes the detection unit 102 to start the detection from a scanning start position, and the detection unit 102 performs the detection while scanning in a direction toward the end portion from the scanning start position. The scanning start position is a position of the printing medium on an inner side of the end portion of the printing medium like the position of the detection unit 102 at the time t1 in FIG. 10B. In the conveyance detection processing executed in advance in S1102, the detection is performed by moving to the position that allows for reading of the end portion of the conveyed printing medium. Therefore, in S1104, the detection unit 102 may perform the detection while moving in the scanning direction (+X direction) or in the opposite direction of the scanning direction (−X direction) from the current position as the scanning start position.

In S1105, the control unit 104 obtains the AD value outputted from the detection unit 102 and sets the obtained AD value to the current output value AD_OUT. In the previous S1104, the detection unit 102 starts the detection from the position of the printing medium. Therefore, the output value AD_OUT obtained first exceeds a second threshold Vth2.

In S1106, the control unit 104 compares the current output value AD_OUT with the second threshold Vth2 to determine whether the current output value AD_OUT is equal to or smaller than the second threshold Vth2. If the control unit 104 determines that the current output value AD_OUT is equal to or smaller than the second threshold (YES in S1106), processing in S1107 is executed.

In S1107, the control unit 104 determines the position of the detection unit 102 in a case where the output value AD_OUT is equal to or smaller than the second threshold Vth2 as a reference end portion position.

For example, the reference end portion position is used in execution of oblique feed detection, pre-cutting detection, or the like. The oblique feed detection is processing in which, after the present flowchart ends, the printing medium is conveyed in the opposite direction of the conveyance direction by a predetermined amount, the reference end portion position detection is performed again, and if the change amount of the reference end portion position is greater than the predetermined amount, it is detected that the printing medium is conveyed obliquely.

Additionally, the pre-cutting detection is processing of detecting whether to cut (pre-cut) the printing medium in the scanning direction to make the width of a non-leading edge region and the width of the leading edge region of the printing medium in a uniform length. For example, whether there is the leading edge region having a shorter width length than the width length of the non-leading edge region is detected by comparing the respective reference end portion positions in the conveyance direction. If the reference end portion position indicating that the width is shorter than that of the non-leading edge region is detected, it is determined that the leading edge region is cut obliquely, and pre-cutting is performed.

On the other hand, if the control unit 104 determines that the current output value AD_OUT is greater than the second threshold (NO in S1106), processing in S1108 is executed.

In S1108, the control unit 104 determines whether the movement amount from the start of scanning by the detection unit 102 is equal to or greater than a predetermined amount. For example, the predetermined amount is an amount equal to or greater than the movement amount by which the detection unit 102 reaches the end portion of the printing medium in a normal case. If the control unit 104 determines that the movement amount is equal to or greater than the predetermined amount (YES in S1108), it can be considered that a trouble occurs in the reference end portion position detection, and thus processing in S1109 is executed. In S1109, the control unit 104 determines that abnormality occurs in the reference end portion position detection.

Additionally, if the control unit 104 determines that the movement amount is smaller than the predetermined amount (NO in S1108), the processing returns to S1105, and again, the AD value outputted from the current detection unit 102 is obtained to update the current output value AD_OUT. Then, the processing in and after S1106 is repeated.

If S1107 or S1109 ends, the processing proceeds to S1110, and in S1110, the control unit 104 stops scanning by the detection unit 102 and ends the detection. The conveyance sequence then ends.

Note that, in the present embodiment, it is described that the position of the detection unit 102 in a case where the current output value AD_OUT is equal to or smaller than the second threshold Vth2 is detected as the end portion. In addition, the scanning start position of the detection unit 102 may be a position on an outer side of the end portion of the printing medium, and the position of the detection unit 102 in a case where the current output value AD_OUT exceeds the second threshold Vth2 may be detected as the end portion.

[About Second Calibration]

Figure 12:
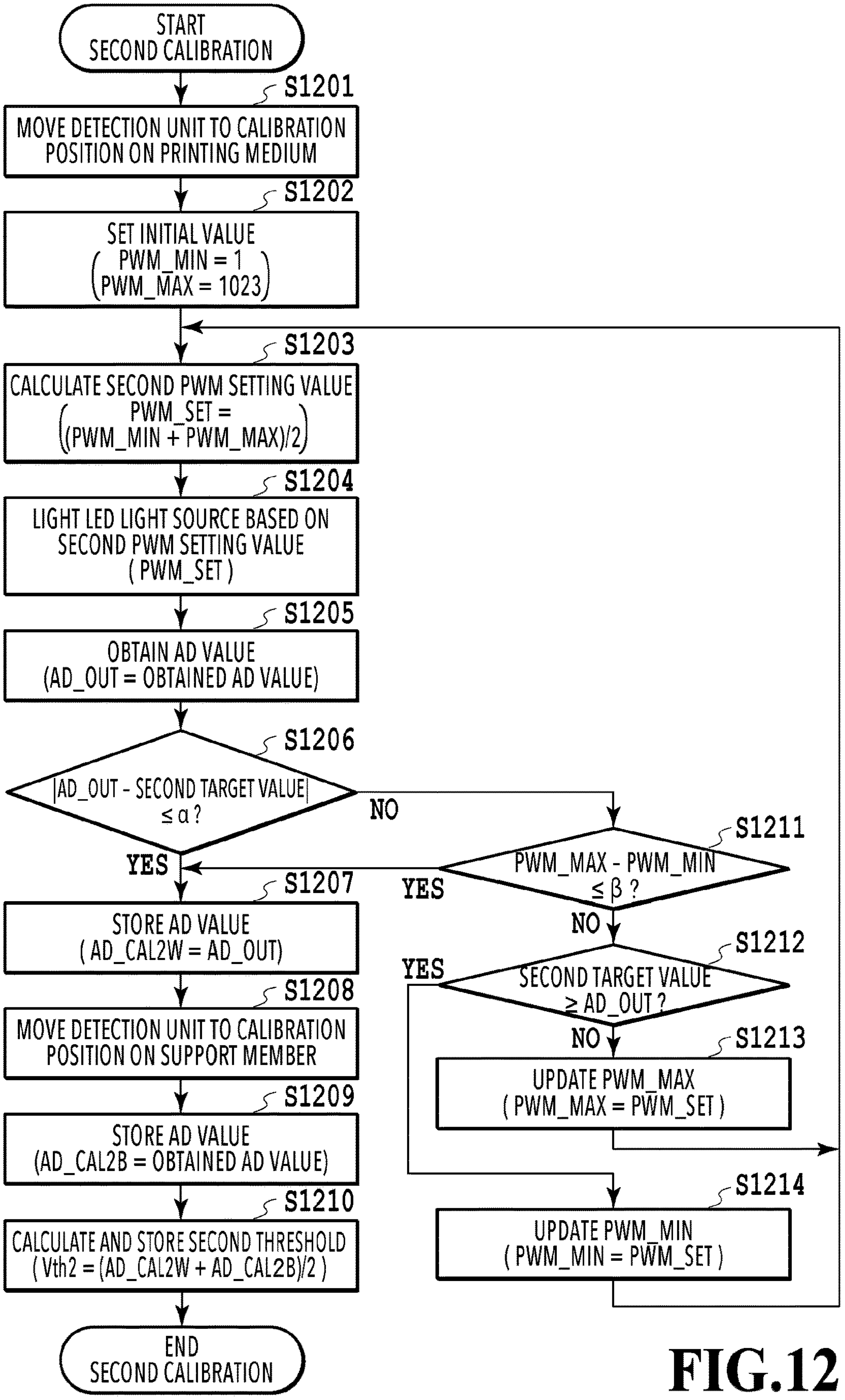
FIG. 12 is a flowchart describing second calibration.

FIG. 12 is a flowchart describing details of the second calibration. Details of S1103 is described with reference to FIG. 12.

In S1201, the control unit 104 moves the detection unit 102 to a second calibration position. The second calibration position is a position in which the conveyed printing medium can be detected.

In S1202, the control unit 104 sets initial values of PWM_MIN and PWM_MAX, which are values for calculating a second PWM setting value PWM_SET described later. For example, PWM_MIN=1 and PWM_MAX=1023 are set.

In S1203, the control unit 104 calculates the second PWM setting value PWM_SET, which is a setting value for PWM-controlling the lighting of the LED light source 301, based on PWM_MIN and PWM_MAX. The second PWM setting value PWM_SET is calculated by the above-described Expression (1).

In S1204, the LED light source 301 is lit based on the set second PWM setting value PWM_SET. The LED light source 301 emits light onto the conveyed printing medium.

In S1205, the detection unit 102 outputs the AD value indicating the light amount of the light, which is emitted from the LED light source 301 and reflected from the conveyed printing medium. The control unit 104 obtains the outputted AD value and sets the value to the current output value AD_OUT. That is, the output value AD_OUT is obtained as a value indicating the light amount of the reflected light from the conveyed printing medium corresponding to the light emission amount based on the current second PWM setting value PWM_SET.

In S1206, the control unit 104 determines whether the obtained current output value AD_OUT is within a range based on the above-described second target value. Specifically, the control unit 104 determines whether |AD_OUT−second target value| is equal to or smaller than the AD convergence determination value α. If the control unit 104 determines that |AD_OUT−second target value| is equal to or smaller than the AD convergence determination value α (YES in S1206), processing in S1207 is executed.

If it is determined as YES in S1206, it means that the current output value AD_OUT is sufficiently close to the second target value. Accordingly, the LED light source 301 is lit based on the current second PWM setting value PWM_SET in the detection by the detection unit 102 during the reference end portion position detection in S1104 in FIG. 11.

In S1207, the control unit 104 sets the current output value AD_OUT to an output value AD_CAL2 W in a case where the detection unit 102 detects the conveyed printing medium, and the processing proceeds to S1208.

In S1208, the control unit 104 moves the detection unit 102 to a position on the support member 204 in which the printing medium is not supported.

In S1209, the detection unit 102 outputs the AD value indicating the light amount of the light reflected from the support member 204. The control unit 104 obtains the outputted AD value and sets the value to an output value AD_CAL2B in a case where the detection unit 102 detects the support member 204. That is, the output value AD_CAL2B is obtained as a value indicating the light amount of the reflected light from the support member 204 corresponding to the light emission amount based on the current second PWM setting value PWM_SET.

In S1210, the control unit 104 calculates the second threshold Vth2 based on the output value AD_CAL2 W and the output value AD_CAL2B, stores the calculated the second threshold Vth2 as the second threshold, and ends the second calibration. The second threshold Vth2 is calculated by Expression (3):

$$Vth2=(AD\_CAL2W+AD\_CAL2B)/2 \qquad \text{Expression (3).}$$

On the other hand, if the control unit 104 determines that |AD_OUT−second target value| is greater than the AD convergence determination value α (NO in S1206), processing in S1211 to S1214 is executed.

The processing in S1211 to S1214 is the same as the first calibration in S909 to S912. The processing is executed while the first PWM setting value in S909 to S912 is replaced with the second setting value, the first threshold in S909 to S912 is replaced with the second threshold, and the first target value in S909 to S912 is replaced with the second target value.

Once the processing in S1211 to S1214 is executed, the processing returns to S1203. In S1203, the control unit 104 calculates Expression (1) again based on the updated PWM_MIN or PWW_MAX and updates the second PWM setting value PWM_SET. For example, with PWM_MIN being updated in S1214, the second PWM setting value PWM_SET is updated such that the increased light emission amount of the light source is emitted. Therefore, it is possible to set the output value AD_OUT obtained in the following S1205 close to the target value.

According to the present embodiment described above, it is possible to properly set the threshold for the end portion detection while suppressing the variation in the output from the detection unit 102.

Embodiment 3

In the present embodiment, a method of detecting another end portion of the printing medium by performing the detection while moving the detection unit 102 with respect to the conveyed printing medium is described. In the present embodiment, a difference from Embodiment 1 is mainly described. A part not stated otherwise is the same configuration and processing as that in Embodiment 1.

[About Processing of Detecting Width Length of Printing Medium]

A method of detecting the width length of the conveyed printing medium based on the second PWM setting value and the second threshold set by the second calibration is described.

Figure 13:
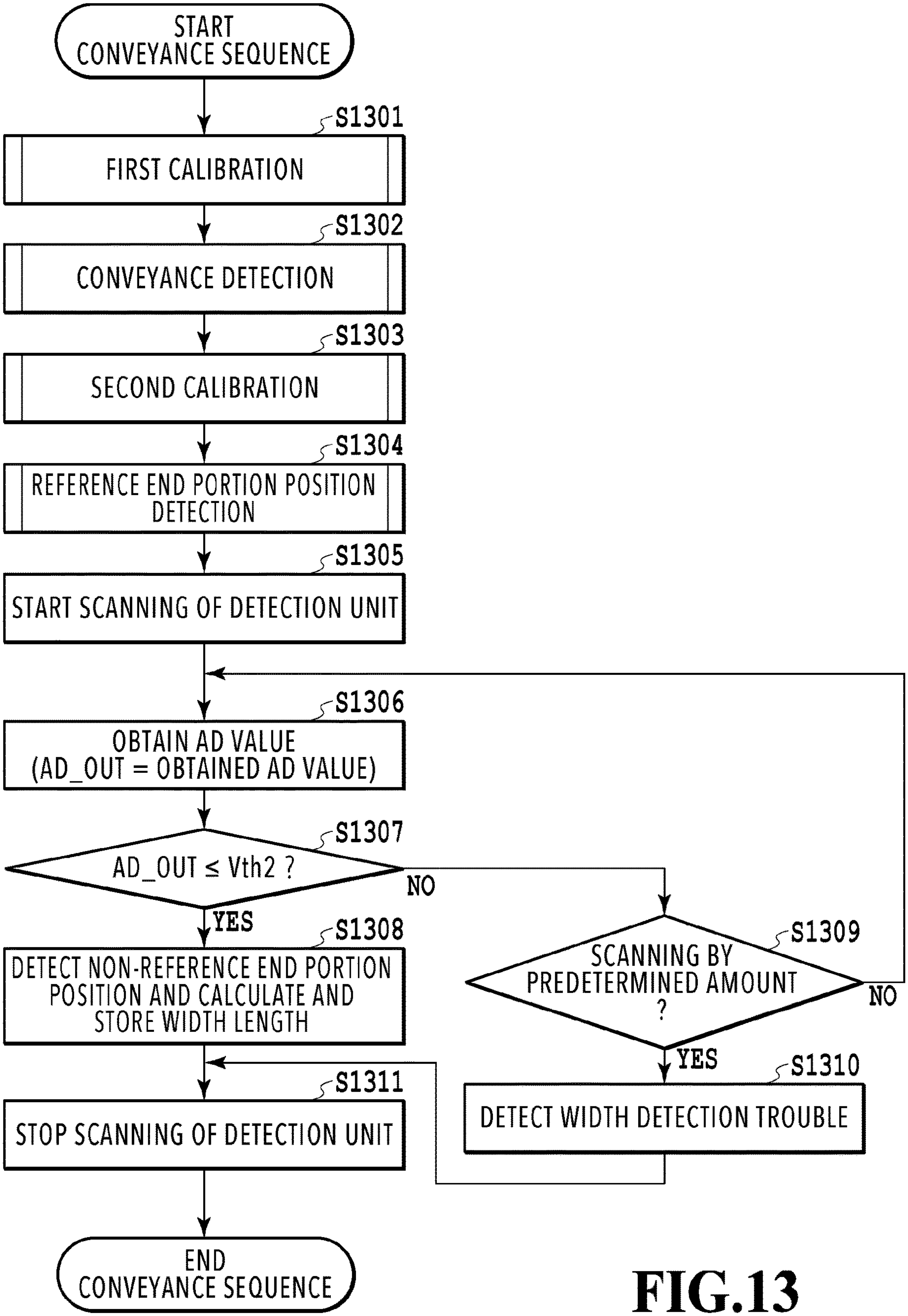
FIG. 13 is a flowchart describing conveyance processing.

FIG. 13 is a flowchart describing processing related to conveyance in the present embodiment.

Since processing in S1301 to S1303 are similar to that in S1101 to S1103, the description is omitted.

In S1304, the reference end portion position detection is executed. Since the reference end portion position detection is the processing in S1104 to S1110 in FIG. 11, the description is omitted. Note that, in a case where occurrence of a detection trouble is determined in the reference end portion position detection, the present flowchart ends.

The following S1305 to S1311 are width detection processing to detect the length (width length) of the conveyed printing medium in the scanning direction. In the width detection, the detection by the detection unit 102 is performed by using the LED light source 301 lit based on the second PWM setting value set in the second calibration.

In S1305, the control unit 104 moves the detection unit 102 to the scanning start position and causes the detection unit 102 to start the detection by emitting the LED light source 301 while moving the detection unit 102 from the scanning start position in a direction toward the non-reference end portion. The scanning start position in S1305 is a position on an inner side of the conveyed printing medium as with the scanning start position in a case of the reference end portion position detection in S1304. Note that, the position may be different from the scanning start position in a case of the reference end portion position detection in S1304.

Additionally, the direction in which the detection unit 102 scans in S1305 is the opposite direction of the direction in which the detection unit 102 scans in a case of the reference end portion position detection in S1304. This is because, out of the two ends of the conveyed printing medium in the scanning direction, the position of the other end portion that is not the reference end portion position determined in S1304 (referred to as a non-reference end portion position) is detected in the width detection processing.

In S1306, the control unit 104 obtains the AD value outputted from the detection unit 102, and the obtained AD value is set to the current output value AD_OUT.

In S1307, the control unit 104 compares the current output value AD_OUT with the second threshold Vth2 to determine whether the current output value AD_OUT is equal to or smaller than the second threshold Vth2. If the control unit 104 determines that the current output value AD_OUT is equal to or smaller than the second threshold (YES in S1307), processing in S1308 is executed.

In S1308, the control unit 104 determines the position of the detection unit 102 in a case where the current output value AD_OUT is equal to or smaller than the second threshold Vth2 as the non-reference end portion position. The control unit 104 can then detect a length (width length) of the conveyed printing medium in the scanning direction by obtaining a distance from the reference end portion position to the non-reference end portion position.

On the other hand, if the control unit 104 determines that the current output value AD_OUT is greater than the second threshold Vth2 (NO in S1307), processing in S1309 is executed.

In S1309, the control unit 104 determines whether the movement amount of the detection unit 102 from the start of scanning by the detection unit 102 is equal to or greater than a predetermined amount. If the control unit 104 determines that the movement amount is equal to or greater than a predetermined amount (YES in S1309), it can be considered that a trouble occurs in the width detection processing, and thus processing in S1310 is executed. In S1310, the control unit 104 determines that abnormality occurs in the width detection.

Additionally, if the control unit 104 determines that the movement amount is smaller than the predetermined amount (NO in S1309), the processing returns to S1306, and again, the AD value outputted from the current detection unit 102 is obtained to update the output value AD_OUT. Then, the processing in and after S1307 is repeated.

If S1308 or S1310 ends, the processing proceeds to S1311, and in S1311, the control unit 104 stops scanning by the detection unit 102 and ends the detection. The conveyance sequence then ends.

Note that, although the scanning start position in S1305 is described to be started from an inner side of the printing medium, an outer side of the printing medium may be the scanning start position as with the reference end portion position detection.

[About Processing of Detecting Leading Edge Position of Printing Medium]

A method of detecting the end portion of the conveyed printing medium in the conveyance direction based on the second PWM setting value and the second threshold set by the second calibration is described.

Figure 14:
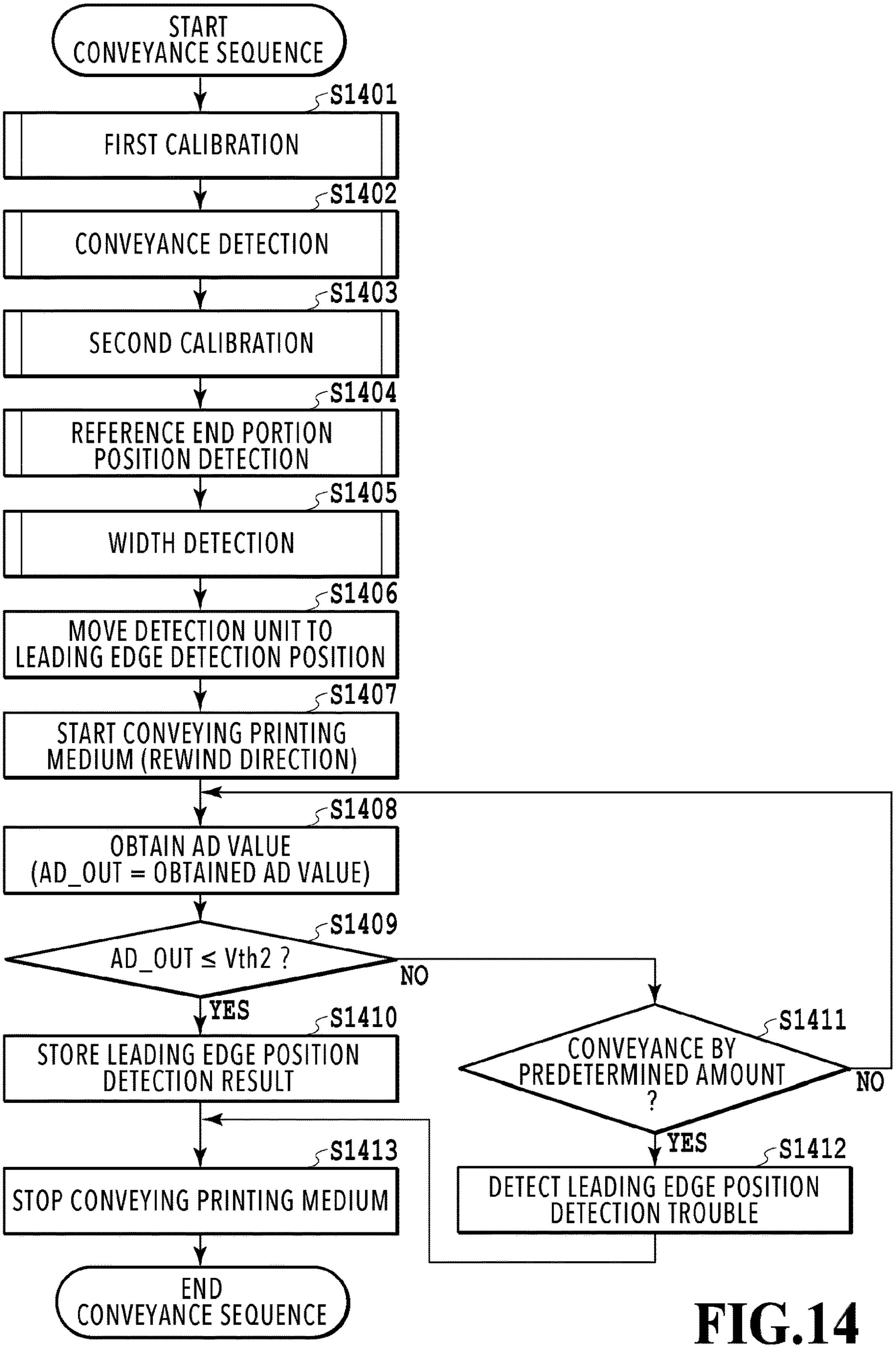
FIG. 14 is a flowchart describing conveyance processing.

FIG. 14 is a flowchart describing processing related to conveyance in the present embodiment.

The description of the processing in S1401 to S1404 is omitted since it is the same as that in S1301 to S1304.

In S1405, the width detection is executed. Since the width detection is the processing in S1305 to S1311 in FIG. 13, the description is omitted. Note that, if it is determined that a width detection trouble occurs in the width detection, the present flowchart ends.

The following S1406 to S1412 are leading edge detection processing to detect the end portion (leading edge) of the conveyed printing medium in the conveyance direction. In the leading edge detection, the detection by the detection unit 102 is performed by using the LED light source 301 lit based on the second PWM setting value set by the second calibration.

In S1406, the control unit 104 moves the detection unit 102 to a leading edge detection position on the conveyed printing medium. Since the two ends of the conveyed printing medium in the scanning direction are detected by the width detection in S1405, a position between the reference end portion position and the non-reference end portion position, which are the detected positions of the two ends of the printing medium, may be set to the leading edge detection position.

In S1407, the control unit 104 causes the conveyance unit 103 to start conveying the printing medium in a rewind direction that is the opposite direction of the conveyance direction.

In S1408, the control unit 104 obtains the AD value outputted from the detection unit 102 and sets the obtained AD value to the current output value AD_OUT. Note that, in the conveyance detection in S1402, the leading edge of the printing medium is conveyed to reach the position in which the detection unit 102 scans. Therefore, the output value AD_OUT obtained first exceeds the second threshold Vth2.

In S1409, the control unit 104 compares the current output value AD_OUT with the second threshold Vth2 to determine whether the current output value AD_OUT is equal to or smaller than the second threshold Vth2. If the control unit 104 determines that the current output value AD_OUT is equal to or smaller than the second threshold Vth2 (YES in S1409), processing in S1410 is executed.

In S1410, if the output value AD_OUT is equal to or smaller than the second threshold Vth2, the control unit 104 determines that the leading edge of the printing medium in the conveyance direction is in the position of the detection unit 102. Thus, information such as the conveyance amount and the like at this time is stored. Additionally, if the conveyance unit 103 stops conveyance in this timing, the leading edge of the printing medium in the conveyance direction is in the position of the detection unit 102. The detection unit 102 is arranged in the printing unit 101 including the printing head. Therefore, with the printing unit 101 starting printing, it is possible to start printing from the leading edge of the printing medium.

On the other hand, if the control unit 104 determines that the current output value AD_OUT is greater than the second threshold Vth2 (NO in S1409), processing in S1411 is executed.

In S1411, the control unit 104 determines whether the conveyance amount of the conveyance unit 103 from the start of conveyance in the rewind direction is equal to or greater than a predetermined amount. If the control unit 104 determines that the conveyance amount is equal to or greater than the predetermined amount (YES in S1411), it can be considered that a trouble occurs in the leading edge position detection. Thus, the processing proceeds to S1412, and the control unit 104 determines that abnormality occurs.

On the other hand, if the control unit 104 determines that the conveyance amount is smaller than the predetermined amount (NO in S1411), the processing returns to S1408, and again, the AD value outputted from the current detection unit 102 is obtained to update the current output value AD_OUT. Then, the processing in and after S1409 is repeated.

If S1410 or S1412 ends, the processing proceeds to S1413, and in S1413, the control unit 104 causes the conveyance unit 103 to end the conveyance of the printing medium. The conveyance sequence then ends.

Note that, in the present embodiment, it is described that the conveyance detection, the reference end portion position detection, the width detection, and the leading edge position detection are all executed. Otherwise, at least one of the conveyance detection, the reference end portion position detection, the width detection, and the leading edge position detection may be performed in the conveyance sequence.

Embodiment 4

In Embodiment 1, the printing apparatus in which one detection unit is arranged is described. In the present embodiment, a printing apparatus in which multiple detection units are arranged is described. In the present embodiment, a difference from Embodiment 1 is mainly described. A part not stated otherwise is the same configuration and processing as that in Embodiment 1.

Figure 15:
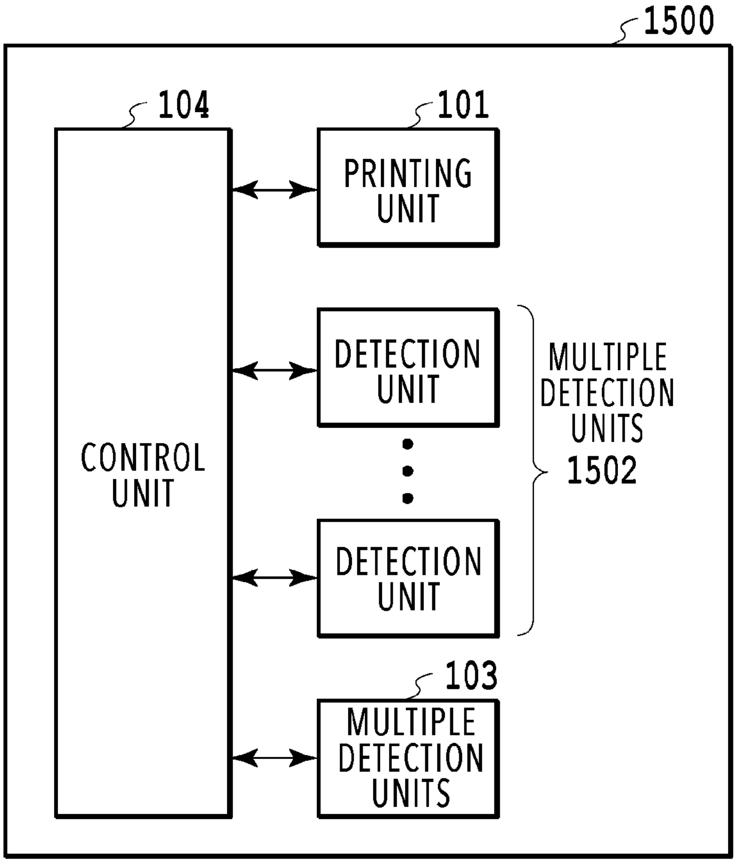
FIG. 15 is a block diagram illustrating a configuration of a printing apparatus.

FIG. 15 is a block diagram describing a configuration of a printing apparatus 1500 in the present embodiment. The description of the same configuration as that of the printing apparatus 100 in Embodiment 1 is omitted by using the same reference numerals. The printing apparatus 100 includes the printing unit 101, the conveyance unit 103, the control unit 104, and multiple detection units 1502 that detect the printing medium. The multiple detection units 1502 include a multiple number of the detection units 102 described in Embodiment 1.

For example, in the above-described embodiments, for the conveyance detection and the leading edge position detection, the detection unit 102 performs the detection by moving to the detection position before performing each detection. The detection units included in the multiple detection units 1502 in the present embodiment may include a detection unit fixed in each detection position for executing the conveyance detection and the leading edge position detection. In this case, it is possible to reduce the time of movement of the detection unit 102.

Next, an example of a method of conveyance control in the printing apparatus 100 including the multiple detection units 1502.

Figure 16:
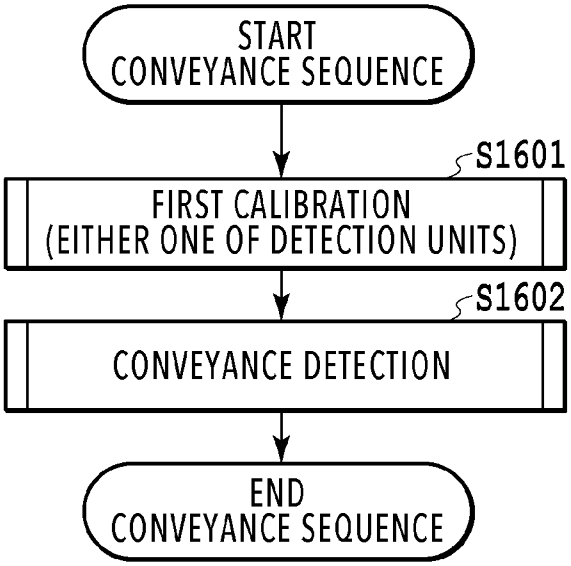
FIG. 16 is a flowchart describing conveyance processing.

FIG. 16 is a flowchart of a case where the conveyance sequence in FIG. 8 is performed by the printing apparatus 1500 in the present embodiment. In S1601, the first calibration is executed. In the first calibration, one of the detection units included in the multiple detection units 1502 that is used in the next conveyance detection is selected, and the first PMW setting value and the first threshold are determined by using the selected detection unit (referred to as a first detection unit). In S1602, the conveyance detection (the processing in S802 to S810) may be performed by using the first detection unit set by the first calibration.

Figure 17:
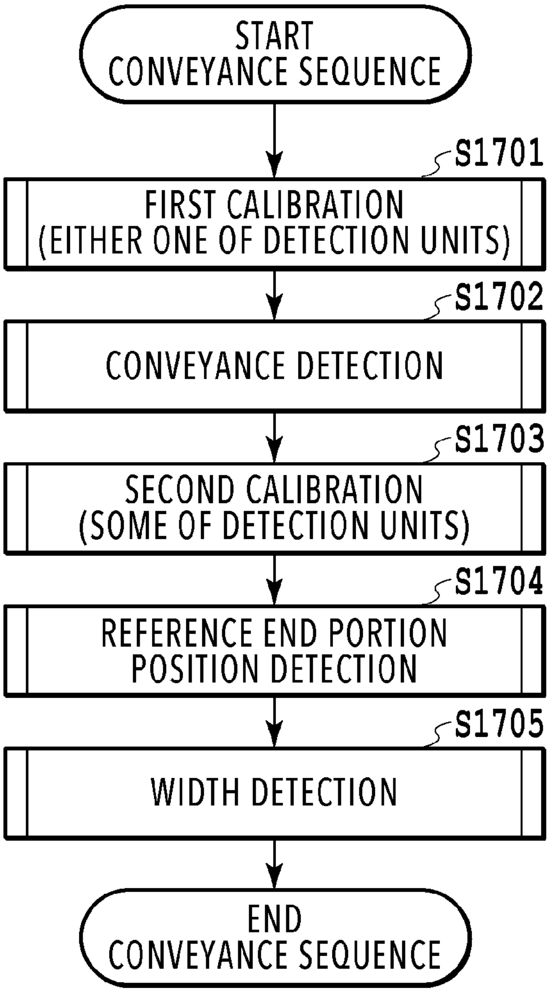
FIG. 17 is a flowchart describing conveyance processing.

FIG. 17 is a flowchart of a case where the conveyance sequence in FIG. 13 is performed by the printing apparatus 1500 in the present embodiment. Since S1701 to S1702 are the same as S1601 to S1602, the descriptions are omitted. In the following S1703, the second calibration is executed. In the second calibration, out of the detection units included in the multiple detection units 1502, the control unit 104 selects a detection unit that detects the reference end portion position (referred to as a second detection unit) and a detection unit that detects the non-reference end portion position (referred to as a third detection unit). Note that, as described above, since the detection unit performs the detection of the reflected light while scanning in the scanning direction or the opposite direction of the scanning direction to detect the end portion in the scanning direction, detection units that are movable in the scanning direction or the opposite direction are selected as the second detection unit and the third detection unit. Then, the control unit 104 executes the second calibration by using each of the selected second detection unit and third detection unit. Then, the second PMW setting value and the second threshold for performing the detection by the selected second detection unit and the second PMW setting value and the second threshold for performing the detection by the third detection unit are set.

In S1704, the reference end portion position is detected by using either one of the second detection unit and the third detection unit set by the second calibration. In S1705, the non-reference end portion position is detected by using the other detection unit that is not used in S1704 out of the second detection unit and the third detection unit set by the second calibration. Then, the width length of the printing medium is detected from the reference end portion position and the non-reference end portion position. Note that, the detection of the reference end portion position and the detection of the non-reference end portion position may be performed by parallel processing. The parallel processing can shorten the time to complete the width detection. Additionally, either of the second detection unit and the third detection unit may be the same as the first detection unit.

Figure 18:
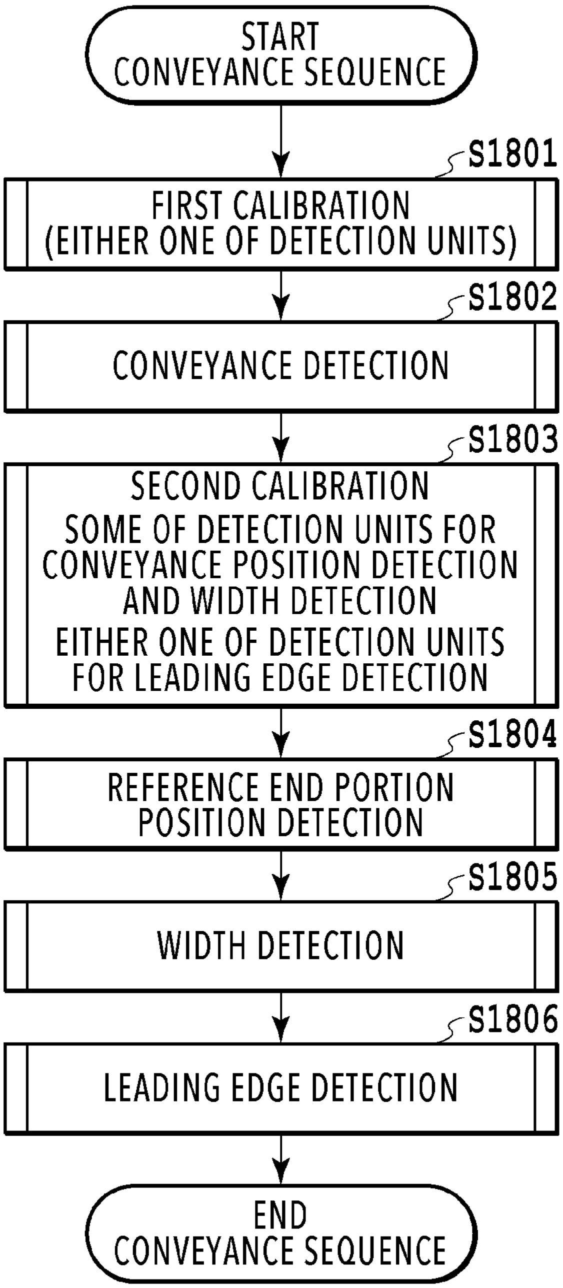
FIG. 18 is a flowchart describing conveyance processing.

FIG. 18 is a flowchart of a case where the conveyance sequence in FIG. 14 is performed by the printing apparatus 1500 in the present embodiment. Since S1801 to S1802 are the same as S1701 to S1702, the descriptions are omitted. In the following S1803, the second calibration is executed. In the second calibration, out of the detection units included in the multiple detection units 1502, the control unit 104 selects the second detection unit that detects the reference end portion position and the third detection unit that detects the non-reference end portion position, and executes the second calibration. This processing is similar to S1703. In S1803, additionally, the control unit 104 selects one detection unit that performs the leading edge detection (referred to as a fourth detection unit) out of the detection units included in the multiple detection units 1502 and executes the second calibration by using the selected fourth detection unit. Then, the second PMW setting value and the second threshold for detecting by the selected fourth detection unit are set.

Since processing in S1804 to S1805 are the same as that in S1704 to S1705, the description is omitted.

In S1806, the leading edge detection processing is performed. In S1806, the leading edge detection in S1406 to 1413 may be performed by using the fourth detection unit set by the second calibration. Note that, the fourth detection unit may be the same as either of the first detection unit, the second detection unit, and the third detection unit.

According to the present disclosure, it is possible to reduce the effect of variation in output from a detection unit that detects a printing medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-090284 filed Jun. 2, 2022, which is hereby incorporated by reference wherein in its entirety.

What is claimed is:

1. A printing apparatus comprising:

a conveyance unit configured to convey a printing medium in a conveyance direction;

a printing unit configured to be in a position facing the printing medium conveyed by the conveyance unit and perform printing on the conveyed printing medium;

a support member configured to be in a position facing the printing unit and support an opposite surface that faces opposite of a surface of the conveyed printing medium facing the printing unit;

a detection unit configured to emit light in a direction toward a surface of the support member supporting the printing medium and output information indicating an amount of light that is reflected; and a control unit configured to perform setting related to the output from the detection unit to set output from the detection unit such that a difference between a value indicating the output from the detection unit in detecting the light reflected from the support member and a value indicating the output from the detection unit in detecting the light reflected from the conveyed printing medium is equal to or greater than a predetermined magnitude, and configured to execute predetermined processing related to an end portion of the conveyed printing medium based on the set output from the detection unit, wherein the predetermined magnitude is determined based on electric noise before the printing medium is conveyed by the conveyance unit.

2. The printing apparatus according to claim 1, wherein the control unit performs setting related to the output from the detection unit by adjusting a light emission amount of the light emitted from the detection unit.

3. The printing apparatus according to claim 1, wherein, before the printing medium is conveyed by the conveyance unit, the control unit causes the detection unit to start detection in a position in which the end portion of the conveyed printing medium passes, and wherein, as the predetermined processing, the control unit performs first processing in which, if a value indicating the output from the detection unit exceeds a first threshold after the conveyance unit starts conveyance of the printing medium, it is determined that the printing medium is normally conveyed by the conveyance unit, and if the value indicating the output from the detection unit does not exceed the first threshold, it is determined that the printing medium is not normally conveyed by the conveyance unit.

4. The printing apparatus according to claim 3, wherein, if the conveyance unit executes processing of conveying the printing medium by a predetermined amount and also the value indicating the output from the detection unit does not exceed the first threshold, the control unit determines that the printing medium is not normally conveyed by the conveyance unit.

5. The printing apparatus according to claim 3, wherein, as first setting for performing the first processing, the control unit performs setting such that a value indicating the output from the detection unit in emitting the light onto the support member is a first value.

6. The printing apparatus according to claim 5, wherein the first threshold is a value based on the first value.

7. The printing apparatus according to claim 1, wherein the control unit causes the detection unit to execute detection while moving the detection unit relative to the conveyed printing medium and performs, as the predetermined processing, second processing in which a value indicating the output from the detection unit and a second threshold are compared with each other to determine the end portion of the conveyed printing medium.

8. The printing apparatus according to claim 7, wherein the control unit causes the detection unit to execute detection while moving the detection unit in a scanning direction orthogonal to the conveyance direction and performs the second processing in which a position in which the value indicating the output from the detection unit reaches the second threshold is determined as an end portion of the conveyed printing medium in the scanning direction.

9. The printing apparatus according to claim 7, wherein the control unit causes the detection unit to execute detection while moving the detection unit in a scanning direction orthogonal to the conveyance direction and performs the second processing in which the value indicating the output from the detection unit is compared with the second threshold to detect one end portion and the other end portion of the conveyed printing medium in the scanning direction and a width length of the conveyed printing medium is determined.

10. The printing apparatus according to claim 7, wherein the control unit causes the detection unit to start detection in a position of the conveyed printing medium and thereafter causes the conveyance unit to convey the printing medium in an opposite direction of the conveyance direction, and performs the second processing in which a position of the detection unit in a case where the value indicating the output from the detection unit is equal to or smaller than the second threshold is determined as an end portion of the conveyed printing medium in the conveyance direction.

11. The printing apparatus according to claim 7, wherein, as second setting for performing the second processing, the control unit performs setting such that the value indicating the output from the detection unit in emitting the light onto the conveyed printing medium is a second value.

12. The printing apparatus according to claim 11, wherein the control unit obtains a third value indicating the output from the detection unit in a case where the detection unit emits the light onto the support member under the second setting, and wherein the second threshold is a value based on the second value and the third value.

13. The printing apparatus according to claim 1, wherein a plurality of detection units are arranged as the detection unit.

14. The printing apparatus according to claim 13, wherein the control unit performs setting for at least each of two detection units out of the plurality of detection units such that a difference between a value indicating the output from the plurality of detection units in detecting the light reflected from the support member and a value indicating the output from the plurality of detection units in detecting the light reflected from the conveyed printing medium is equal to or greater than the predetermined magnitude, and detects one end portion and the other end portion of the conveyed printing medium in a scanning direction orthogonal to the conveyance direction based on the output from the set at least each of the two detection units.

15. The printing apparatus according to claim 1, wherein the printing medium conveyed by the conveyance unit includes plain paper and a printing medium having a lower reflectivity than that of the plain paper.

16. The printing apparatus according to claim 1, wherein the support member has a lower reflectivity than that of the printing medium conveyed by the conveyance unit.

17. A method for controlling a printing apparatus, wherein the printing apparatus includes:

a conveyance unit configured to convey a printing medium in a conveyance direction, a printing unit configured to be in a position facing the printing medium conveyed by the conveyance unit and perform printing on the conveyed printing medium, a support member configured to be in a position facing the printing unit and support an opposite surface that faces opposite of a surface of the conveyed printing medium facing the printing unit, and a detection unit configured to emit light in a direction toward a surface of the support member supporting the printing medium and output information indicating an amount of light that is reflected, the method comprising:

performing setting related to the output from the detection unit to set output from the detection unit such that a difference between a value indicating the output from the detection unit in detecting the light reflected from the support member and a value indicating the output from the detection unit in detecting the light reflected from the conveyed printing medium is equal to or greater than a predetermined magnitude; and executing predetermined processing related to an end portion of the conveyed printing medium based on the set output from the detection unit, wherein the predetermined magnitude is determined based on electric noise before the printing medium is conveyed by the conveyance unit.

18. A non-transitory computer-readable storage medium storing a program to cause a computer to perform a method for controlling a printing apparatus, wherein the printing apparatus includes:

a conveyance unit configured to convey a printing medium in a conveyance direction, a printing unit configured to be in a position facing the printing medium conveyed by the conveyance unit and perform printing on the conveyed printing medium, a support member configured to be in a position facing the printing unit and support an opposite surface that faces opposite of a surface of the conveyed printing medium facing the printing unit, and a detection unit configured to emit light in a direction toward a surface of the support member supporting the printing medium and output information indicating an amount of light that is reflected, the method comprising:

performing setting related to the output from the detection unit to set output from the detection unit such that a difference between a value indicating the output from the detection unit in detecting the light reflected from the support member and a value indicating the output from the detection unit in detecting the light reflected from the conveyed printing medium is equal to or greater than a predetermined magnitude; and executing predetermined processing related to an end portion of the conveyed printing medium based on the set output from the detection unit, wherein the predetermined magnitude is determined based on electric noise before the printing medium is conveyed by the conveyance unit.

* * * * *